(12) United States Patent
Jin et al.

(10) Patent No.: US 8,612,683 B2
(45) Date of Patent: Dec. 17, 2013

(54) FIRST STORAGE CONTROL APPARATUS AND FIRST STORAGE CONTROL APPARATUS CONTROL METHOD

(75) Inventors: Azusa Jin, Sagamihara (JP); Yoshiaki Eguchi, Yokohama (JP); Akira Deguchi, Yokohama (JP); Hiroaki Akutsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 13/203,696

(22) PCT Filed: Aug. 1, 2011

(86) PCT No.: PCT/JP2011/004357
§ 371 (c)(1),
(2), (4) Date: Aug. 26, 2011

(87) PCT Pub. No.: WO2013/018130
PCT Pub. Date: Feb. 7, 2013

(65) Prior Publication Data
US 2013/0036286 A1    Feb. 7, 2013

(51) Int. Cl.
*G06F 12/02*    (2006.01)
(52) U.S. Cl.
USPC .................... 711/117; 711/170; 711/E12.002

(58) Field of Classification Search
USPC .................... 711/117, 170, E12.002
See application file for complete search history.

(56) References Cited

U.S. PATENT DOCUMENTS

| 5,440,737 | A | 8/1995 | Uchinuma |
| 2007/0094395 | A1 | 4/2007 | Mizuno et al. |
| 2009/0049241 | A1 | 2/2009 | Ohno et al. |
| 2009/0070541 | A1 | 3/2009 | Yochai |
| 2010/0169569 | A1 | 7/2010 | Yamamoto et al. |

FOREIGN PATENT DOCUMENTS

| JP | 20045370 A | 1/2004 |
| JP | 200511277 A1 | 1/2005 |

*Primary Examiner* — Yong Choe
(74) *Attorney, Agent, or Firm* — Volpe And Koenig, P.C.

(57) ABSTRACT

The present invention creates a pool comprising tiers corresponding to the performance of logical volumes.

A first storage apparatus either acquires or measures the performance of multiple external pool volumes of an external storage (S1711 through S1714), and creates a pool volume group based on the performance of the external pool volumes (S1715, S1716). The rank order of a tier is decided in accordance with the performance of each pool volume group (S1717, S1718). This makes it possible to relatively easily create a pool comprising multiple appropriate tiers that are suited to the current situation.

14 Claims, 31 Drawing Sheets

FIG. 6

External drive performance management table — 320

| External storage ID | Drive type | Drive response [ms] | Drive IOPS [IOPS] |
|---|---|---|---|
| EXT01 | SSD | 1 | 800 |
| EXT01 | SAS | 5 | 80 |
| EXT01 | SATA | 10 | 8 |
| EXT02 | Unknown | Unknown | Unknown |
| ... | ... | ... | ... |

External storage performance management table

_711_ _712_ _713_

| External storage ID | Controller performance [IOPS] | Port performance [MB/sec] |
|---|---|---|
| EXT01 | 20000 IOPS | 800MB/Sec |
| EXT02 | Unknown | Unknown |
| EXT03 | 30000 IOPS | 1600 MB/sec |
| ... | ... | ... |

External storage management table 322

| External storage ID (811) | Number of coupled volumes (812) | Number of paths (813) |
|---|---|---|
| EXT01 | 10 | 2 |
| EXT02 | 15 | 1 |
| EXT03 | Unknown | Unknown |
| ... | ... | ... |

Internal drive performance management table — 323

| Internal drive type (911) | Drive response [ms] (912) | Drive IOPS [IOPS] (913) |
|---|---|---|
| SSD | 1 | 1000 |
| SAS | 5 | 100 |
| SATA | 10 | 10 |
| ... | ... | ... |

Pool volume performance management table

| Pool Vol ID | Attribute | External storage ID | Drive type | RAID Level | Pool Vol response [ms] | Pool Vol IOPS [IOPS] |
|---|---|---|---|---|---|---|
| 001 | Internal | — | SSD | 3D1P | 1 | 3000 |
| 002 | Internal | — | SATA | 6D2P | 10 | 60 |
| 003 | Internal | — | SATA | 6D2P | 10 | 60 |
| 004 | Internal | — | SATA | 6D2P | 10 | 60 |
| 005 | External | EXT02 | SAS | 3D1P | 5 | 240 |
| 006 | External | EXT02 | SAS | 3D1P | 5 | 240 |
| 007 | External | EXT02 | SAS | 3D1P | 5 | 240 |
| ... | ... | ... | ... | ... | ... | ... |

Pool volume group management table 325

| Pool ID 1111 | Pool Vol ID 1112 | External storage ID 1113 | Pool Vol group name 1114 | Response [ms] 1115 | IOPS [IOPS] 1116 | External controller performance 1117 | External path performance 1118 | External Tier IOPS 1119 |
|---|---|---|---|---|---|---|---|---|
| A | 001 | — | SSD Tier | 1 | 3000 | — | — | — |
| A | 002-004 | — | SATA Tier | 10 | 180 | — | — | — |
| A | 005-007 | EXT 02 | External Tier_A-1 | 5 | 720 | | | 1120 |
| ... | ... | ... | ... | ... | ... | ... | ... | |

Tier order management table

| Pool ID | Tier# | Pool Vol group name | Tier order determination criteria (Response or IOPS) |
|---------|-------|---------------------|------------------------------------------------------|
| A | Tier1 | SSD Tier | 1ms |
| A | Tier2 | External Tier_A-1 | 5ms |
| A | Tier3 | SATA Tier | 10ms |
| ... | ... | ... | ... |

Performance potential management table — 327

| Pool ID (1311) | Tier# (1312) | Pool Vol group name (1313) | Performance potential (1314) |
|---|---|---|---|
| A | Tier1 | SSD Tier | XXX IOPS |
| A | Tier2 | External Tier_A-1 | YYY IOPS |
| A | Tier3 | SAS Tier | ZZZ IOPS |
| ... | ... | ... | ... |

Pool volume response management table

| Pool Vol ID (1411) | IOPS (1412) | Response time [ms] (1413) |
|---|---|---|
| 001 | 1 | 1 |
| 001 | 5 | 1.1 |
| 001 | 10 | 1.1 |
| 001 | 15 | 1.2 |
| 001 | ... | ... |
| 001 | 100 | 20 |
| 001 | ... | ... |
| 001 | 200 | 50 |
| 002 | ... | ... |
| ... | ... | ... |

Tier response curve management table 329

| Pool ID<br>1511 | Tier#<br>1512 | Pool Vol<br>Group name<br>1513 | IOPS<br>1514 | Response<br>time [ms]<br>1515 |
|---|---|---|---|---|
| Pool A | Tier1 | SSD Tier | 1 | 1 |
| Pool A | Tier1 | SSD Tier | 5 | 1.1 |
| Pool A | Tier1 | SSD Tier | 10 | 1.1 |
| Pool A | Tier1 | SSD Tier | 15 | 1.2 |
| ... | ... | ... | ... | ... |
| Pool A | Tier1 | SSD Tier | 100 | 20 |
| ... | ... | ... | ... | ... |
| Pool A | Tier1 | External Tier_A-1 | 200 | 50 |
| Pool A | Tier2 | External Tier_A-1 | 1 | 4 |
| Pool A | Tier2 | External Tier_A-1 | 5 | 4 |
| Pool A | Tier2 | External Tier_A-1 | 10 | 4 |
| Pool A | Tier2 | External Tier_A-1 | 15 | 5 |
| ... | ... | ... | ... | ... |
| Pool A | Tier2 | External Tier_A-1 | 50 | 10 |
| ... | ... | ... | 79 | 12 |
| Pool A | Tier2 | External Tier_A-1 | 80 | 9999 |
| ... | ... | ... | ... | ... |

1516

FIRST STORAGE CONTROL APPARATUS AND FIRST STORAGE CONTROL APPARATUS CONTROL METHOD

TECHNICAL FIELD

The present invention relates to a first storage control apparatus and a first storage control apparatus control method.

BACKGROUND ART

Companies are currently in the process of increasing the size and complexity of their storage systems to keep pace with increasing data. For this reason, the companies are seeking to facilitate the management and enhance the utilization efficiency of storage apparatuses.

One technology for meeting these demands is thin provisioning. In thin provisioning, the storage system provides a host computer with a virtual logical volume (hereinafter, a virtual volume) that does not comprise a physical storage area. The storage system dynamically allocates a page inside a pool to the virtual volume in accordance with a write request to the virtual volume from the host computer. A "pool" is a cluster of pool volumes. A pool volume comprises multiple pages. A "page" is a physical storage area.

According to thin provisioning technology, it is possible to efficiently use the capacity of the storage system, and, in addition, to easily perform a storage system capacity design. This is because in thin provisioning, a page may be allocated in accordance with the actual usage of the virtual volume.

A pool is generally comprised of media (a group of pages) of the same performance. However, the access frequencies of multiple pages allocated to a virtual volume are normally not the same. Among the multiple pages allocated to the virtual volume are a mix of high access frequency pages and low access frequency pages. Therefore, in a technology that allocates pages of the same performance to the virtual volume, performance excesses and deficiencies may occur.

For example, in a case where a pool comprises only high-performance media (high-performance pages), a performance overload will occur with respect to a low access frequency page. Alternatively, in a case where a pool comprises only low-performance media (low-performance pages), a performance deficit will occur with respect to a high access frequency page.

One method for solving this problem is disclosed in Patent Literature 1. According to Patent Literature 1, one pool is hierarchized by comprising multiple media of different performance. The data in a page is reallocated from the tier, which comprises this page, to a tier that is optimal for the access frequency of this page.

Furthermore, technology for incorporating a logical volume of another storage apparatus inside its own apparatus, and providing this logical volume to the host computer as if it were its own logical volume is known (Patent Literatures 2 and 3).

CITATION LIST

Patent Literature

[PTL 1]
US Patent Application No. 2009/0070541
[PTL 2]
Japanese Patent Application Laid-open No. 2005-011277
[PTL 3]
Japanese Patent Application Laid-open No. 2004-005370

SUMMARY OF INVENTION

Technical Problem

According to the prior art, a first storage apparatus can use a logical volume of a second storage apparatus that exists externally as a pool volume in a pool of the first storage apparatus. This makes it possible to consolidate and make effective use of the storage resources of the storage system in the first storage apparatus.

However, in the prior art, the performance of the logical volume of the second storage apparatus cannot be appropriately assessed. This is because there is the likelihood that the first storage apparatus and the second storage apparatus are provided by respectively different vendors, and, in addition, that the types of the controllers and the storage devices (media) of the storage apparatuses are very different.

For this reason, in the prior art, it is not possible to define a logical volume of the second storage apparatus in an appropriate tier in a pool of the first storage apparatus. In a case where the performance of the logical volume in the second storage apparatus is unknown, for example, this logical volume must be defined in the lowest level tier. Therefore, the problem is that even in a case where the second storage apparatus comprises a logical volume that is higher performance than the logical volume of the first storage apparatus, this high-performance logical volume cannot be used effectively.

With the foregoing problems in view, an object of the present invention is to provide a first storage control apparatus and a first storage control apparatus control method that make it possible to achieve a pool comprising an appropriate tier structure based on performance information from multiple logical volumes. Another object of the present invention is to provide a first storage control apparatus and a first storage control apparatus control method that are able to acquire performance information from multiple logical volumes, create multiple volume groups based on this performance information, and provide a tier inside a pool based on the performance information of each volume group.

Solution to Problem

To solve for the above-mentioned problems, a first storage control apparatus according to the present invention is communicatably coupled to at least one second storage control apparatus via a communication path, and comprises a pool and a controller for controlling the pool, wherein the controller acquires volume performance information denoting the performance of multiple logical volumes, creates multiple volume groups by grouping the logical volumes based on the acquired volume performance information, computes volume group performance information denoting the performance of each of the volume groups, decides a rank order of the volume groups in accordance with the computed volume group performance information, and disposes tiers of the volume groups in the pool based on the decided rank order.

The multiple logical volumes comprise first logical volumes of the first storage control apparatus, and second logical volumes of the second storage control apparatus, and the second logical volume may be associated with a prescribed first logical volume of the first logical volumes via the communication path.

The controller may acquire volume performance information by treating, from among the second logical volumes, second logical volumes which belong to the same second storage control apparatus and which are created based on the same type of storage devices, as a single second logical volume.

The controller may acquire the volume performance information related to the second logical volume from a management computer which is communicatably coupled to the first storage control apparatus and the second storage control apparatus.

The controller can use, as the volume performance information of the second logical volume, a performance with the smallest value from among a throughput performance of the second logical volume, a controller performance of the second storage control apparatus for controlling the second logical volume, and a communication port performance of the second storage control apparatus for controlling the second logical volume.

The controller can group together the second logical volumes based on the volume performance information of the first logical volume.

The controller, in accordance with a preconfigured prescribed trigger, may recompute the performance information of the volume groups, decide the rank order of the volume groups based on the recomputed performance information of the volume groups, and dispose tiers of the volume groups in the pool.

The prescribed trigger may comprise at least any one of a case in which a configuration of the pool has changed, a case in which the number of the second logical volumes coupled to the prescribed first logical volume has changed, or a case in which the hardware configuration of the second storage control apparatus has changed.

The controller can also issue, to the second logical volume, a test command that is prepared beforehand, and acquire the volume performance information related to the second logical volume based on a response from the second logical volume.

The controller may acquire a response curve denoting a relationship between a processing request load and a response time based on a response time of the second logical volume with respect to the test command, and may acquire the volume performance information related to the second logical volume based on this response curve.

The characteristic features of the present invention described hereinabove can be combined in various ways other than those stated. In addition, the present invention can also be understood as a computer program. The computer program is installed in a computer via either a communication medium or a recording medium.

BRIEF DESCRIPTION OF DRAWINGS

FIG. 6 shows an external drive performance management table.

FIG. 7 shows an external storage performance management table.

FIG. 8 shows an external storage management table.

FIG. 9 shows an internal drive performance management table.

FIG. 10 shows a pool volume performance management table.

FIG. 11 shows a pool volume group management table.

FIG. 12 shows a tier ranking management table.

FIG. 13 shows a performance potential management table.

FIG. 14 shows a pool volume response curve management table.

FIG. 15 shows a tier response curve management table.

DESCRIPTION OF EMBODIMENTS

The embodiment of the present invention will be explained below by referring to the attached drawings. In this embodiment, as will be explained further below, the performance information of each logical volume in the storage system is acquired, the respective logical volumes are grouped together, and the tier configuration of the pool is decided. In this embodiment, not only drive performance, but also the controller performance and port performance of an external storage apparatus (a second storage apparatus) can be taken into account as the performance information. In accordance with this, in this embodiment it is possible to make effective use of the storage resources inside the storage system, both the capacity and the performance aspects, and, in addition, it is possible to lower the costs of the storage system.

Furthermore, in the following explanation, various types of information may be explained using the expression "xxx table", but the various information may also be expressed using a data structure other than a table. To show that the various information is not dependent on the data structure, "xxx table" can be called "xxx information".

In the following explanation, there may be cases where the processing is explained using a "program" as the doer of the action. A stipulated process is executed in accordance with a program being executed by a processor (for example, a CPU (Central Processing Unit)) while using a memory or other such storage resource and a communication port or other such communication interface device as needed. Therefore, the doer of the processing may be the processor. The processor may comprise dedicated hardware in addition to the CPU. A computer program may be installed in a computer from a program source. The program source, for example, may be either a program delivery server or a storage medium.

For example, each element, such as the pool volume, can be identified using an identifier (ID), a number, or a name.

An example of the present invention will be explained below using the drawings. The present invention is not limited to the example explained hereinbelow, and all sorts of application examples that match the idea of the present invention are included in the technical scope of the present invention. Furthermore, unless specifically limited, each component may be either plural or singular.

Example 1

Figure 1:
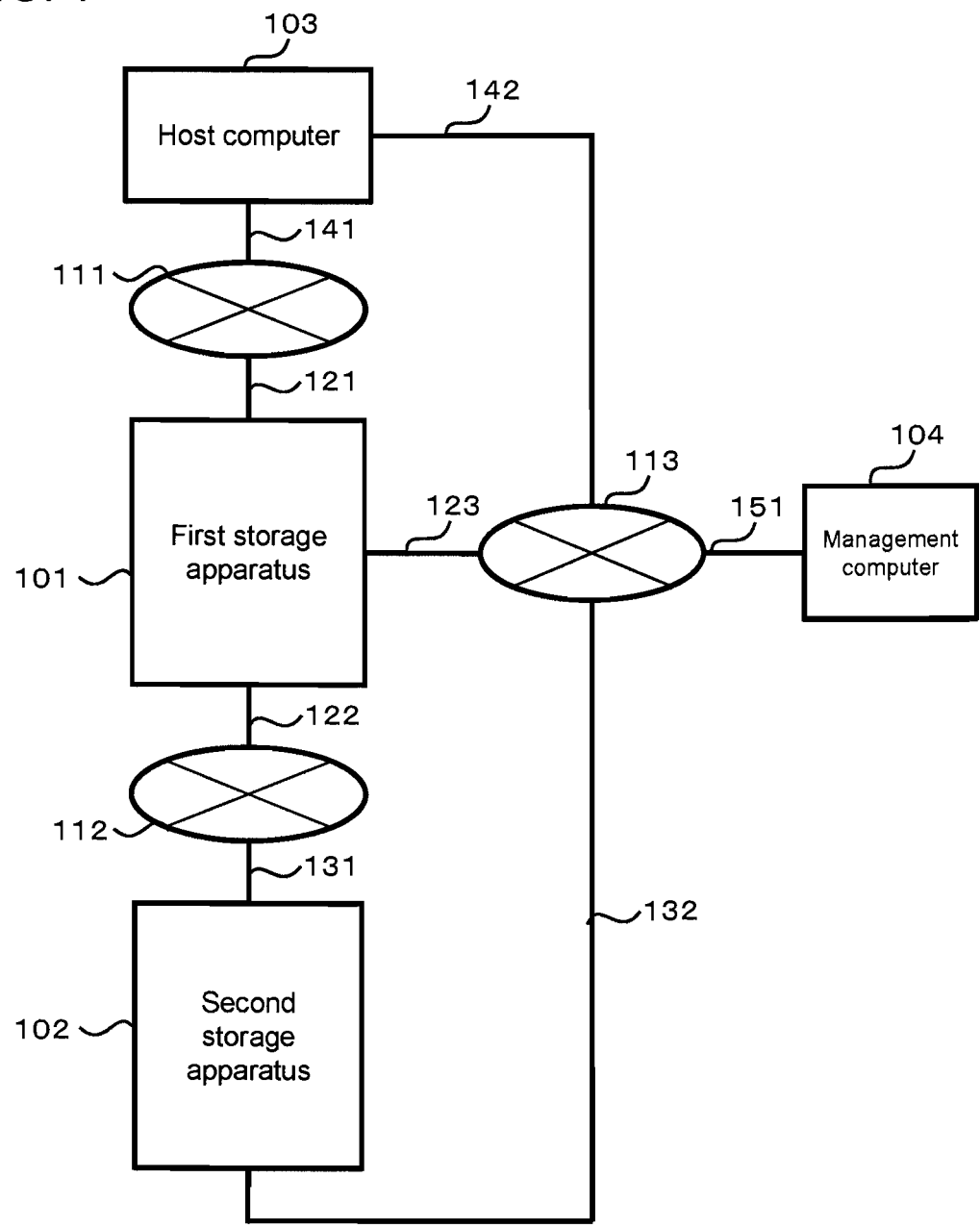
FIG. 1 is an illustration showing an entire storage system of the present invention.

FIG. 1 shows the overall configuration of a storage system. The storage system, for example, can comprise either one or multiple first storage apparatuses 101, either one or multiple second storage apparatuses 102, either one or multiple host computers 103, and either one or multiple management computers 104.

The first storage apparatus 101 and the host computer 103, for example, are coupled via a first communication network 111. The first storage apparatus 101 and the second storage apparatus 102, for example, are coupled via a second communication network 112. The first storage apparatus 101 and the management computer 104, for example, are coupled via a third communication network 113. The second storage apparatus 102 and the management computer 104, for example, are also coupled via the third communication network 113. The host computer 103 and the management computer 104, for example, are also coupled via the third communication network 113.

The first communication network 111 and the second communication network 112, for example, are configured as a SAN (Storage Area Network). The third communication network 113, for example, is configured as a LAN (Local Area Network).

The first storage apparatus 101 is coupled to the first communication network 111 via a communication line 121. The first storage apparatus 101 is coupled to the second communication network 112 via a communication line 122. The first storage apparatus 101 is coupled to the third communication network 113 via a communication line 123.

The second storage apparatus 102 is coupled to the second communication network 112 via a communication line 131. The second storage apparatus 102 is coupled to the third communication network 113 via a communication line 132.

The host computer 103 is coupled to the first communication network 111 via a communication line 141. The host computer 103 is coupled to the third communication network 113 via a communication line 142. The management computer 104 is coupled to the third communication network 113 via a communication line 151.

Furthermore, the communication lines 121, 122, 123, 131, 132, 141, 142, and 151, for example, comprise fixed lines of either metal cable or fibre optic cable. However, the configuration may also be such that the host computer 103 and the first storage apparatus 101, the first storage apparatus 101 and the second storage apparatus 102, the first storage apparatus 101 and the management computer 104, the host computer 103 and the management computer 104, and the second storage apparatus 102 and the management computer 104, respectively, are coupled wirelessly. In the case of wireless coupling, the communication lines 121, 122, 123, 131, 132, 141, 142, and 151 are omitted.

At least two of the first communication network 111, the second communication network 112, and the third communication network 113 may be shared networks.

Figure 2:
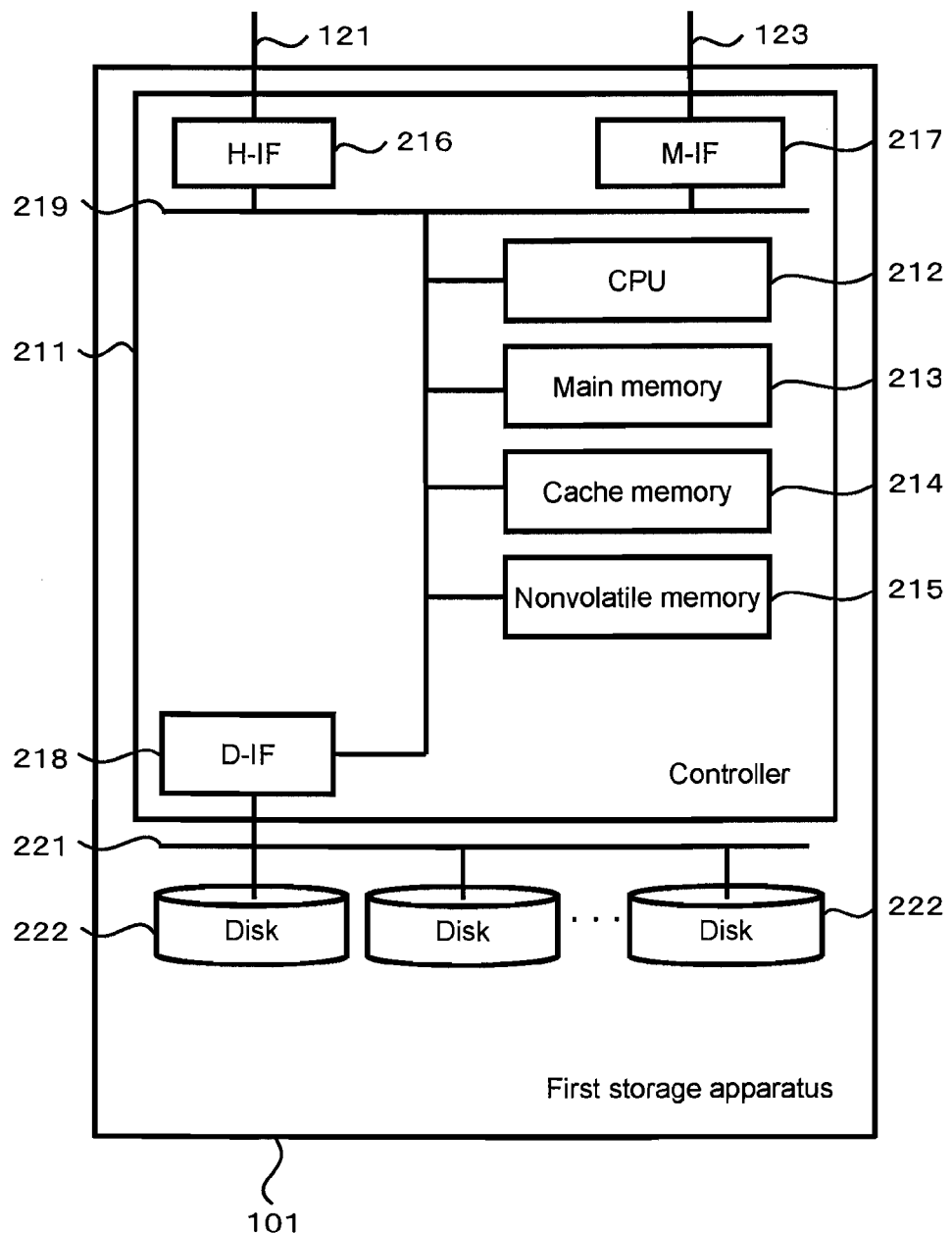
FIG. 2 shows the hardware configuration of a first storage apparatus.

FIG. 2 shows the hardware configuration of the first storage apparatus 101. The first storage apparatus 101, for example, can be broadly divided into a controller 211 and multiple disks 222. To make a distinction with the controller of the second storage apparatus 102, the controller 211 can also be called the first controller 211. The second storage apparatus 102 controller can also be called either the second controller or the external controller.

The type of disk 222 serving as the "storage device", for example, can be a SSD (Solid State Drive), a SAS (Serial Attached SCSI)-HDD (Hard Disk Drive), or a SATA (Serial Advanced Technology Attachment)-HDD. However, the present invention is not limited to these types, and FeRAM (Ferroelectric Random Access Memory), MRAM (Magnetoresistive Random Access Memory), Ovonic Unified Memory, RRAM (Resistance RAM: registered trademark), and various other storage devices can also be used.

The disk 222 is coupled to the controller 211 via a fiber channel cable or other such communication line 221. Furthermore, either one or multiple RAID (Redundant Array of Independent Disks) groups can be configured using multiple disks 222. The physical storage areas of the respective disks 222 are consolidated into a single storage area by the RAID group. Either one or multiple logical volumes are created using the physical storage area of the RAID group.

As will be described further below, of the multiple logical volumes disposed in the first storage apparatus 101, a logical volume created based on the RAID group inside the first storage apparatus 101 will be called the internal volume. A logical volume, which is not based on the RAID group inside the first storage apparatus and is coupled to a logical volume of the second storage apparatus 102, will be called the externally coupled volume.

The hardware configuration of the controller 211 will be explained. The controller 211 controls a data write and a data read to and from the disk 222 in accordance with a command received from the host computer 103. The controller 211 provides the host computer 103 with a virtual volume 511 (Refer to FIG. 5) that conforms to thin provisioning. The virtual volume (may also be called the thin provisioning volume) 511 is configured from multiple virtual areas. These virtual areas are virtual storage areas, and, for example, are expressed using LBAs (Logical Block Addresses). The virtual storage area can be called a virtual page in comparison to an actual storage area (Refer to FIG. 5) in a pool 512. The actual storage area in the pool 512 can also be called the actual page.

The controller 211, for example, comprises a storage resource, a communication interface device (hereinafter, interface device will be abbreviated as "IF"), and a CPU 212 coupled thereto. The storage resource, for example, comprises a main memory 213, a cache memory 214, and a nonvolatile memory 215. The communication IF, for example, comprises a host IF (H-IF) 216, a management IF (M-IF) 217, and a disk IF (D-IF) 218. These respective memories 213, 214 and 215, the CPU 212, the host IF 216, the management IF 217, and the disk IF 218 are coupled to one another via a bus such as a communication line 219.

The nonvolatile memory 215, for example, can be a rewritable nonvolatile memory like flash memory. The nonvolatile memory 215 stores a computer program and information.

Figure 3:
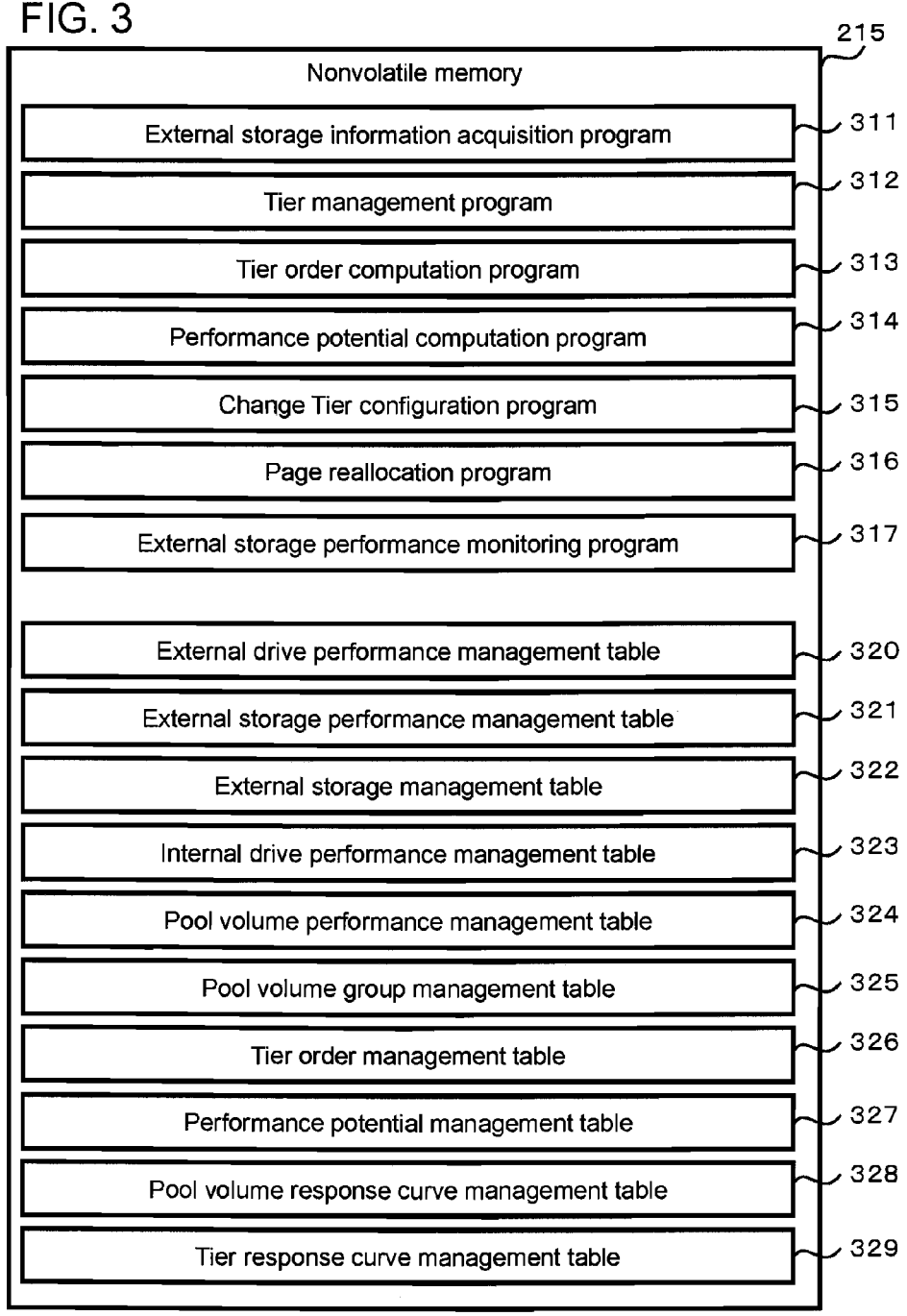
FIG. 3 shows the storage contents of a memory of the first storage apparatus.

Specifically, for example, the nonvolatile memory 215 stores the computer programs 311, 312, 313, 314, 315, 316, and 317, and the respective tables 320, 321, 322, 323, 324, 325, 326, 327, 328, and 329 as shown in FIG. 3. Each program and table is transferred from the nonvolatile memory 215 to the main memory 213, and executed by the CPU 212.

The computer programs stored in the nonvolatile memory 215, for example, include an external storage information acquisition program 311, a tier management program 312, a tier ranking computation program 313, a performance potential computation program 314, a tier configuration change program 315, a page reallocation program 316, and an external storage performance monitoring program 317.

The tables stored in the nonvolatile memory 215, for example, include an external drive performance management table 320, an external storage performance management table 321, an external storage management table 322, an internal drive performance management table 323, a pool volume performance management table 324, a pool volume group management table 325, a tier ranking management table 326, a performance potential management table 327, pool volume response curve management table 328, and a tier response curve management table 329.

The external storage information acquisition program 311 determines whether performance information of the external storage apparatus 102 can be acquired from the management computer 104. The external storage information acquisition program 311 records performance information acquired from the external storage apparatus 102 in the external drive performance management table 320 and the external storage performance management table 321. The details of this processing will be explained further below using FIGS. 17, 18 and 19.

Using the first storage apparatus 101 as the reference, the second storage apparatus 102 is called the external storage apparatus because it exists outside of the first storage apparatus 101. The internal volume of the second storage apparatus 102 is called the external volume because it exists outside of the first storage apparatus 101. The external volume is coupled to the externally coupled volume (the EVol in FIG. 5), which is virtually disposed inside the first storage apparatus 101 and is associated with an address space.

A command with respect to the externally coupled volume is converted to a command for the external volume corresponding to the externally coupled volume, and is sent from the first storage apparatus 101 to the second storage apparatus 102. The first storage apparatus 101 writes data received from the host computer 103 to the external volume, and sends data read from the external volume to the host computer 103. The host computer 103 makes use of the external volume inside the second storage apparatus 102 by way of the externally coupled volume inside the first storage apparatus 101. For the host computer 103, the external volume is no different than a normal logical volume (internal volume) of the first storage apparatus 101.

In the following explanation, for the sake of convenience, the first storage apparatus 101 may be called either the first storage or the master storage. The second storage apparatus 102 may be called the second storage or the external storage.

In a case where performance information of the external storage 102 cannot be acquired from the management computer 104, the external storage information acquisition program 311 measures the performance of the externally coupled volume (specifically, the external volume coupled to the externally coupled volume), and records this measurement result in the pool volume response curve management table 328. The details of this processing will be explained further below using FIGS. 17, 20 and 21, but the external storage information acquisition program 311 issues a test I/O that was prepared beforehand to the external volume mounted in the first storage apparatus 101, and measures the response performance of the external volume.

The tier management program 312 computes the drive performance (for example, the response performance and the IOPS performance) for each pool volume, and records this result in the pool volume performance management table 324. The details of this processing will be explained further below using FIGS. 17 and 23. IOPS is the total value (Input/Output per second) of a write request and a read request per unit of time.

The tier management program 312 sorts the pool volumes by comparing the pool volume performance (for example, the response performance) recorded in the pool volume performance management table 324, and records this result in the pool volume group management table 325. The details of this processing will be explained further below using FIGS. 17 and 24.

The tier management program 312 computes the drive performance for each pool volume group, and records this result in the pool volume group management table 325. The details of this processing will be explained further below using FIGS. 17 and 25.

The tier ranking computation program 313 decides the rank order of the tiers by comparing the performance value for each tier in the pool volume group management table 325, and records this result in the tier ranking management table 326. The details of this processing will be explained further below using FIG. 26.

The performance potential computation program 314 decides the performance potential for each tier in the pool volume group management table 325, and records this result in the performance potential management table 327. The performance potential computation program 314 decides the performance potential of each tier using the results in the pool volume response management table 328. The details of this processing will be explained further below using FIGS. 17, 27 and 28.

The tier configuration change program 315 changes the configuration of the tiers based on the tier rankings and performance potentials decided using the programs 311 through 314. The details of the processing of the program 315 will be explained further below using FIG. 29.

The page reallocation program 316 changes the tier to which a virtual volume-allocated page is allocated in accordance with the utilization status of this page. The page reallocation program 316 monitors the accesses to the virtual volume-allocated page, and determines the appropriate tier to which this page should belong based on the access frequency of the page. The page reallocation program 316 copies the data of the target page to a page inside the migration-destination tier based on the result of the determination. For example, the data of a page that is accessed frequently is moved to a higher level tier than the current tier. In contrast, the data of a page that is accessed infrequently is moved to a lower level tier than the current tier. The details of the processing of the program 316 will be explained further below using FIG. 30.

The external storage performance monitoring program 317 monitors the performance of the external storage. The external volume performance is either computed by the tier management program 312 or measured by the external storage information acquisition program 311. The external storage performance monitoring program 317 monitors whether or not the performance of the external pool volume is proper even after a fixed period of time has elapsed, and revises the performance information. The details of the processing of the program 317 will be explained further below using FIG. 31.

The external drive performance management table 320 is for managing the performance value for each external storage drive type. The details of this table 320 will be explained further below using FIG. 6.

The external storage performance management table 321 is for managing the system performance of the external storage, for example, the controller performance and the port performance. The details of this table 321 will be explained further below using FIG. 7.

The external storage management table 322 is for managing the number of volumes (external volumes) that the external storage has mounted in the first storage apparatus 101, and the number of paths that couple the externally coupled volume and the external volume. This table 322 will be explained further below using FIG. 8.

The internal drive performance management table 323 is for managing the performance for each type of disk 222 of the first storage apparatus 101. Since the disk 222 resides inside the first storage apparatus 101, it is called an internal drive. The details of this table 323 will be explained further below using FIG. 9.

The pool volume performance management table 324 is for managing information (for example, an attribute and performance) related to the performance of a pool volume that has been created. The details of this table 324 will be explained further below using FIG. 10.

The pool volume group management table 325 manages how the pool volumes will be sorted. In addition, the pool volume group management table 325 manages the performance value for each sorted pool volume group (hereinafter, pool volume group). The details of this table 325 will be explained further below using FIG. 11.

The tier ranking management table 326 is for managing the number of the tier to which a pool volume group inside a pool belongs. This table 326 will be explained further below using FIG. 12.

The performance potential management table 327 is for managing the performance potential for each pool volume group inside the pool. This table 327 will be explained further below using FIG. 13. Performance potential is the maximum IOPS that a pool volume group (a tier configured from this pool volume group) is able to process.

The pool volume response curve management table 328 is for managing a response curve for each pool volume. This table 328 will be explained further below using FIG. 14.

The tier response curve management table 329 is for managing a response curve for each pool volume group. This table 329 will be explained further below using FIG. 15.

FIG. 2 will be referred to once again. The respective programs 311 through 317 stored in the nonvolatile memory 215 are read to the main memory 214 as necessary. The various processes described hereinbelow are carried out by the CPU 212 executing each program read to the main memory 213.

The cache memory 214 temporarily stores data received from the host computer 103 and data read from the disk 222.

The host IF 216 is coupled to the host computer 103 via the communication line 121 and the communication network 111, and the communication line 141. Of multiple communication ports of the host IF 216, the communication port comprising a target attribute receives an access command (either a write command or a read command) issued from the host computer 103. Of the multiple communication ports of the host IF 216, the communication port comprising an initiator attribute is coupled to a communication port of the second storage apparatus 102 via the communication network 112, and issues a command to the second storage apparatus 102. Furthermore, a communication IF for communications with the host computer 103 and a communication IF for communications with the second storage apparatus 102 may be configured separately.

The management IF 217 is coupled to the management computer 104 via the communication line 123, and the communication network 113 and the communication line 151. The management IF 217, for example, is configured as a NIC (Network Interface Card).

The disk IF 218 sends and receives data to and from the respective disks 222. The disk IF 218 is respectively coupled to each disk 222 via a communication line 221.

Next, the basic operation of the first storage apparatus 101 will be explained in brief. Upon receiving a write command from the host computer 103, the controller 211 stores the write data received from the host computer 103 in the cache memory 214.

The controller 211 transfers the write data that was stored in the cache memory 214 to the disk 222 via the disk IF 218, and writes this write data to the disk 222. Furthermore, the controller 211 can notify the host computer 103 to the effect that write command processing has been completed at the point in time that the write data is stored in the cache memory 214. Or the controller 211 can notify the host computer 103 to the effect that write command processing has been completed at the point in time that the write data is written to the disk 222.

Upon receiving a read command from the host computer 103, the controller 211 checks whether or not the data that is the target of this read command (the read-target data) is stored in the cache memory 214.

In a case where the read-target data is stored in the cache memory 214, the controller 211 reads this data from the cache memory 214, and sends it to the host computer 103 via the host IF 216. Alternatively, in a case where the read-target data is not stored in the cache memory 214, the controller 211 reads the read-target data from the disk 222 via the disk IF 218, and stores this data in the cache memory 214. The controller 211 sends the read-target data that was stored in the cache memory 214 to the host computer 103 via the host IF 216.

The preceding is a normal write process and a normal read process. In a write process and a read process with respect to the virtual volume, which is a thin provisioning volume, the allocation of a page, the identification of a pool volume corresponding to the page, and data read/write processing to the pool volume occur. In addition, in a case where the pool volume corresponds to a volume (external volume) inside the second storage apparatus 102, data read/write processing to the external volume occurs.

Figure 4:
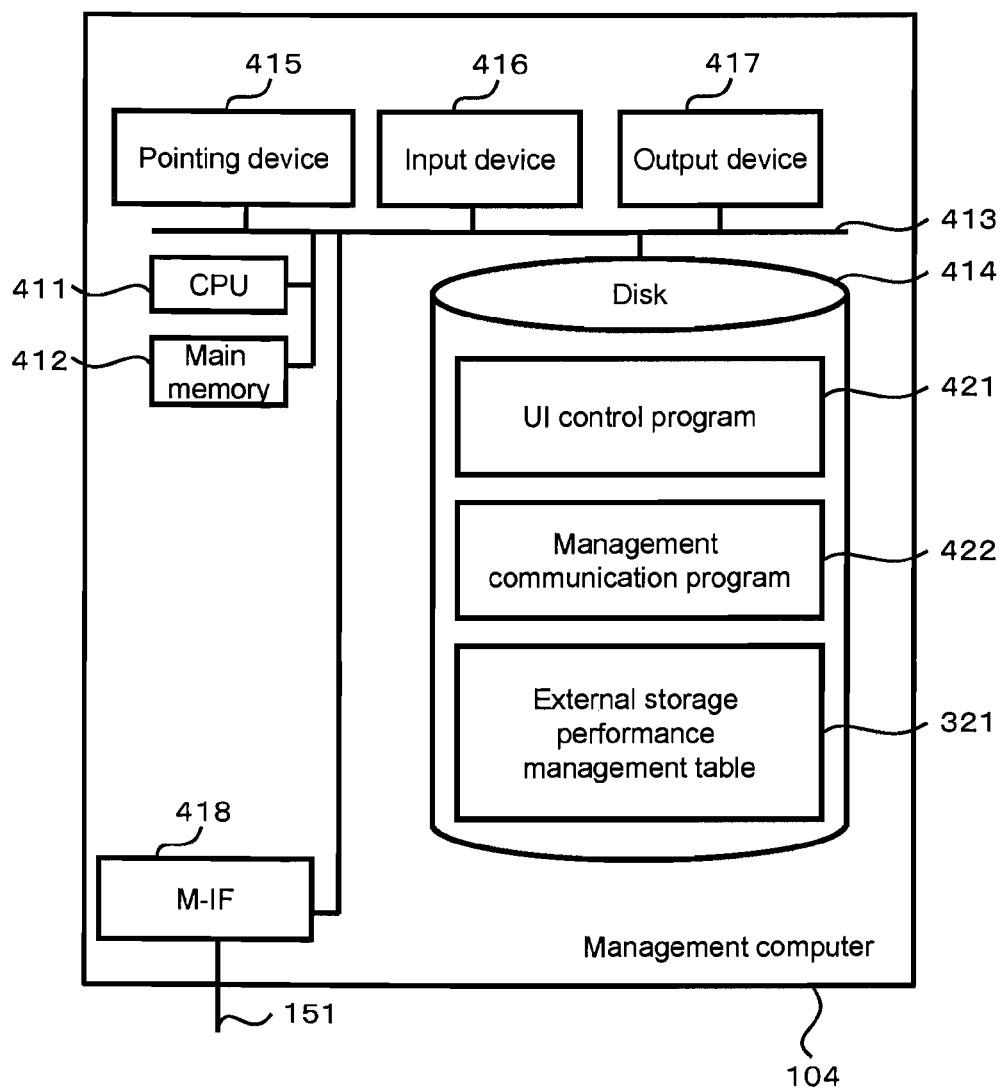
FIG. 4 shows the hardware configuration of a management computer.

FIG. 4 shows the hardware configuration of the management computer 104. The management computer 104 comprises the same hardware configuration as an ordinary computer. For example, the management computer 104 comprises a storage resource, a communication interface device, an input device 416, an output device 417, and a CPU 411 coupled thereto.

The communication interface device is a management IF 418. The storage resource, for example, comprises a main memory 412 and a disk 414. The CPU 411, main memory 412, disk 414, pointing device 415, input device 416, output device 417, and management IF 418 are coupled to one another via a bus 413.

The input device 416 is for inputting either an instruction or information to the management computer 104, and, for example, comprises a keyboard and/or a pointing device and so forth. The input device 416 may also comprises a device for performing an input using either voice or a physical movement. The output device 417 is for outputting information to either an external administrator or user from the management computer 104, and, for example, comprises a display and/or a printer or the like. The output device 417 may also comprise a voice output device.

The disk 414, for example, stores a UI (User Interface) control program 421, a management communication program 422, and an external storage management table 322.

The UI control program 421 and the management communication program 422 are loaded into the main memory 412 from the disk 414. The CPU 411 executes a UI control process and a management communication process by executing the programs stored in the main memory 412.

The UI control program 421 displays on the output device 417 a screen such as a tier information confirmation screen 1600, which will be described further below. The UI control program 421 also stores information, which has been inputted by the administrator (may be a user other than the administrator) via the input device 416, in the main memory 412.

The management communication program 422 communicates with the first storage apparatus 101 via the communication network 113. The management communication program 422, for example, sends information that was inputted by the administrator to the first storage apparatus 101 as needed.

The external storage performance management table 321 is for managing a performance value for each external storage drive type. The details of this table 321 will be explained further below using FIG. 6. The external storage performance management table 321, for example, can be created based on information inputted by the administrator. Or, the external storage performance management table 321 may be created from information held in the management computer 104.

The hardware configuration of the host computer 103 is the same as that of an ordinary computer. Therefore, a drawing will be omitted. The host computer 103 comprises a communication interface device, a storage resource, and a CPU coupled thereto. The communication interface device, for example, comprises a host bus adapter (HBA) for carrying out communications via the communication network 111, and a NIC for carrying out communications via the communication network 113. The storage resource, for example, includes a main memory, a cache memory, and an auxiliary storage device.

Figure 5:
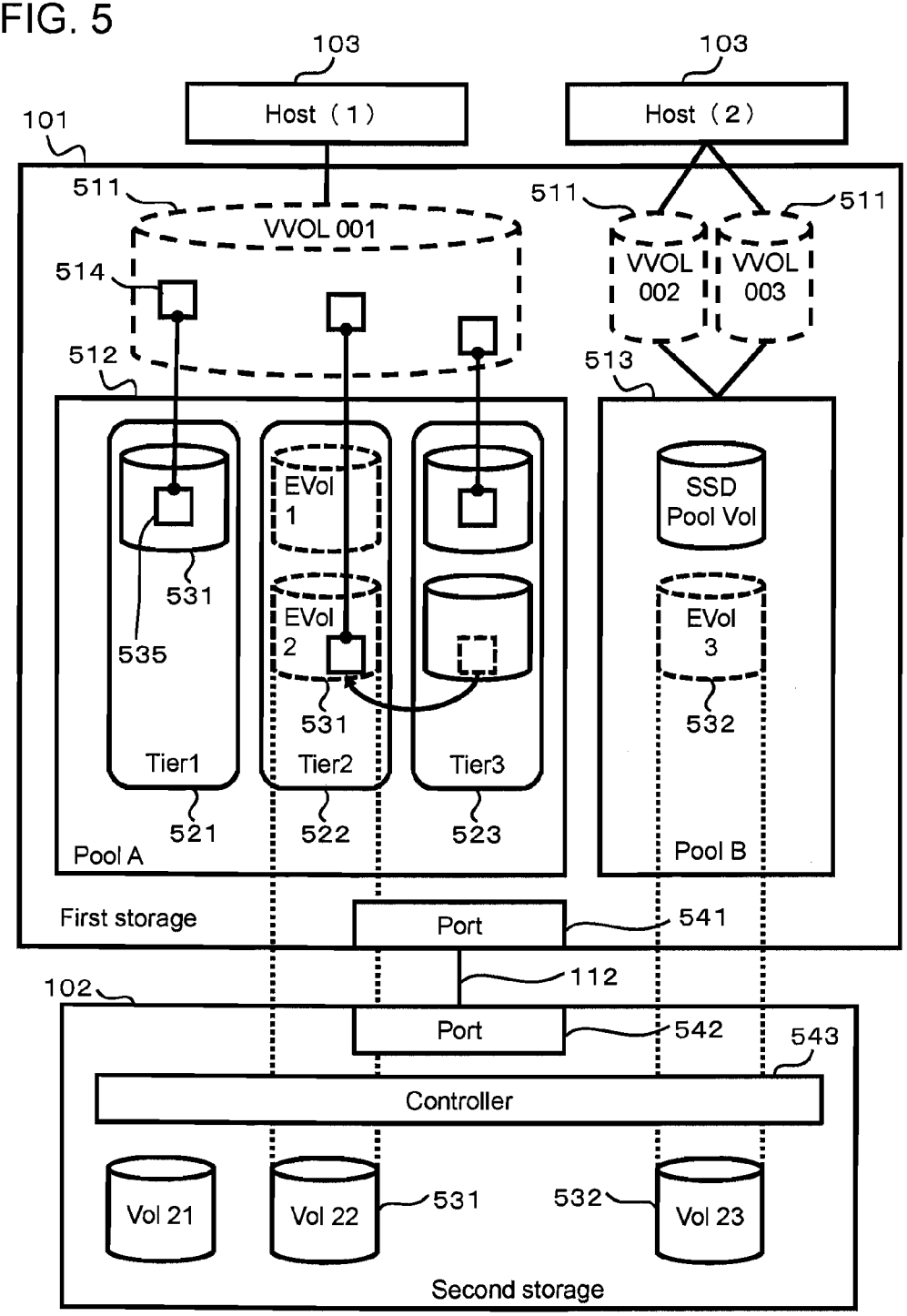
FIG. 5 is an illustration schematically showing the relationship between a virtual volume and a pool, and a pool volume.

FIG. 5 is an illustration schematically showing the relationship between the virtual volume and pool, and the pool volume.

The virtual volume 511 is a virtual logical volume, and is created using a storage area within the pool 512. The virtual volume 511 is configured from multiple virtual areas 514. One pool 512 is configured from multiple tiers 521 through 523. Each tier comprises multiple pool volumes 531. Each pool volume 531 is configured from multiple pages 535.

In the example shown in the left side of FIG. 5, the virtual volume 511 (VVOL001) is coupled to one host computer 103(1). The pool 512, which provides the storage area to this virtual volume 511 (VVOL001), is partitioned into three tiers 521 through 523 from a first tier to a third tier.

The pool 512 is configured from storage media (storage devices) having different performance. In other words, the pool 512 comprises multiple tiers 521 through 523, which differ in performance. It is supposed that the lower the tier number, the higher the performance. The first tier 521 is a high-performance tier configured from the storage devices with the highest performance. The second tier 522 is a medium-performance tier configured from the next highest performance storage devices. The third tier 523 is a low-performance tier configured from the lowest performance storage devices. Furthermore, the present invention is not limited to three tiers; either two tiers, or four or more tiers may be disposed in a pool.

In the example shown in the right side of FIG. 5, a host computer 103(2) uses two virtual volumes 511 (VVOL002) and 511 (VVOL003). The host computer 103(2) can access all the areas of these virtual volumes 511 (VVOL002, VVOL003). The virtual volumes 511 (VVOL002, VVOL003) are created using the storage areas within a single pool 513. The pool 513, for example, comprises multiple pool volumes 532 having different performance. The pool 513 is not partitioned into tiers.

The explanation will focus on the virtual volume 511 (VVOL001). A page 535 (actual page) in the first tier 521 is allocated to the virtual area 514 (virtual page) in the virtual volume 511 (VVOL001). The data in the virtual area 514 is actually stored in the actual page 535 allocated to the virtual area 514. The actual page 535 is a portion of the pool volume. Therefore, the data of the actual page 535 is actually stored in one or more disks 222 that are providing physical storage areas to this pool volume. The controller 211 is in charge of converting the logical address of the virtual page and the logical address in the pool and converting the logical address in the pool and the physical address of the disk 222.

In FIG. 5, the logical volume 531 (Vol22) of the second storage apparatus 102 is mounted to the externally coupled volume 531 (EVol2) in the first storage apparatus 101. Some of the lines have been omitted, but logical volume 531 (Vol21) of the second storage apparatus 102 is mounted to the externally coupled volume 531 (EVol1) in the first storage apparatus 101.

The first storage apparatus 101 couples a volume of the second storage apparatus 102 to an externally coupled volume (EVol). In accordance with this, the first storage apparatus 101 treats the volume of the second storage apparatus 102 just like it was a first storage apparatus 101 internal volume, and uses it as a pool volume. The pool volume that is used as an external volume may be called the external pool volume in this example.

In FIG. 5, the controller 211 of the first storage apparatus 101 sends write data addressed to the external volume mounted in the first storage apparatus 101 from the communication port 541 of the first storage apparatus 101 to the communication port 542 of the second storage apparatus 102 by way of the communication network 112.

This write data is written to the storage device (disk) of the second storage apparatus 102 by way of the controller 543 of the second storage apparatus 102. Since the disk of the second storage apparatus 102 can be configured the same as the disk 222 of the first storage apparatus 101, a drawing will be omitted.

As shown in FIG. 5, multiple external volumes (Vol21, Vol22, and Vol23) of the second storage apparatus 102 share the controller 543, the communication port 542 and the communication network 112. Therefore, when assessing the performance of the externally coupled volume (EVol), it is preferable to take into account not only the performance of the external volume coupled to this externally coupled volume, but also the status of the communication path that couples the externally coupled volume with the external volume.

For example, even in a case where the external volume is configured from a high-performance storage device, when the processing performance of the controller 543 is low, the controller 543 constitutes a bottleneck, making it impossible to handle the external volume as high-performance. Also, for example, in a case where either the load on the communication port 542 is high or the communication network 112 is congested, the communication port 542 becomes a bottleneck.

In addition, even in a case where the configuration related to the one pool 512 in the first storage apparatus 101 does not change at all, when the configuration of the other pool 513 in the first storage apparatus 101 has changed, this configuration change is likely to affect the one pool 512. For example, in a case where a large number of external pools of the second storage apparatus 102 have been provided to the other pool 513 in the first storage apparatus 101, the load on the controller 543, the communication port 542, or the communication network 112 will increase. Therefore, there is the danger that the performance related to the one pool 512 of the first storage apparatus 101 will drop.

The process for migrating data stored in a page to a page in another tier will be briefly explained using FIG. 5. This process is called migration process.

For example, the data stored in a page in the second tier 522 is to be migrated to the page indicated by the dotted line in the third tier 523 because this data is accessed infrequently. Specifically, the data is to be copied from the pool volume (the pool volume in the second tier) comprising the migration-source page to the pool volume (the pool volume in the third tier) comprising the migration-destination page.

The respective tables stored in the nonvolatile memory 215 of the first storage apparatus 101 will be explained below. FIGS. 6 through 15 are illustrations showing the table configurations.

FIG. 6 shows the external drive performance management table 320 for managing the performance of the external drive. The external drive performance management table 320 is updated by the external storage information acquisition program 311.

The external drive performance management table 320, for example, correspondingly manages an "external storage ID" column 611, a "drive type" column 612, a "drive response [ms]" column 613, and a "drive IOPS [IOPS]" column 614.

Information for identifying an external storage coupled to the first storage apparatus 101 is stored in the "external storage ID" column 611. Specifically, a device ID of the second storage apparatus 102 is configured in the column 611.

Information showing the type of storage device of the external storage is stored in the "drive type" column 612. For example, values such as SSD, SAS-HDD, SATA-HDD and so forth are stored in column 612.

Drive performance per storage device mounted in the external storage is stored in the "drive response [ms]" column 613. The response performance, for example, may be the response performance of the storage device when the I/O load is low, or may be the average response performance of the storage device.

Throughput per storage device installed in the external storage is stored in the "drive IOPS [IOPS]" column 614. For example, the maximum number of I/Os that this storage device is able to process per unit of time is stored in column 614. For example, as shown in the second row 615 of FIG. 6, the response performance of the SSD installed in the external storage ID "EXT01" is 1 ms, and the throughput performance is 800 IOPS.

The external storage performance management table 321 for managing the performance of the external storage is shown in FIG. 7. The external storage performance management table 321 is updated by the external storage information acquisition program 311.

The external storage performance management table 321, for example, correspondingly manages an "external storage ID" column 711, a "controller performance [IOPS]" column 712, and a "port performance [MB/sec]" column 713. In this example, the controller performance and the port performance are managed in order to manage the external storage performance, but the present invention is not limited to this, and the size of the external storage cache memory may also be managed.

Information for identifying another storage apparatus coupled to the first storage apparatus 101 is stored in the "external storage ID" column 711. Specifically, the storage ID of the second storage apparatus 102 is given in column 711.

The external storage CPU performance, for example, is stored in the "controller performance [IOPS]" column 712. Specifically, the maximum performance of the controller 543 of the second storage apparatus 102 is stored in column 712.

The external storage port performance is stored in the "port performance [MB/sec]" column 713. For example, the maximum value from among the throughput performance of the communication port 542 of the second storage apparatus 102, the throughput performance of toe switch (not shown) in the communication network 112, and the throughput performance of the communication lines 121 and 131 coupled to the first storage apparatus 101 is stored in the port performance column 713.

For example, the second row 714 of FIG. 7 shows that the controller performance of the external storage ID "EXT01" is 20000 IOPS, and the port performance is 800 MB/sec.

FIG. 8 shows the external storage management table 322 for managing the external storage. The external storage management table 322 is updated by the external storage information acquisition program 311.

The external storage management table 322, for example, correspondingly manages an "external storage ID" column 811, a "number of coupled volumes" column 812, and a "number of paths" column 813.

The ID of a storage apparatus coupled to the first storage apparatus 101 is stored in the "external storage ID" column 811. Specifically, for example, the apparatus ID of the second storage apparatus 102 is given.

The number of external storage volumes mounted in the first storage apparatus 101 is stored in the "number of coupled volumes" column 812. That is, the number of logical volumes (external volumes) provided to the first storage apparatus 101 from the second storage apparatus 102 is stored in the column 812.

The number of communication paths coupling the external storage to the first storage apparatus 101 is stored in the "number of paths" column 813.

For example, the second row 814 of FIG. 8 shows that the external storage ID "EXT01" is providing 10 volumes to the fist storage apparatus 101, and that there are two communication paths.

FIG. 9 shows the internal drive performance management table 323 for managing the internal drive. The internal drive is the storage device 222 (disk 222) of the first storage apparatus 101.

The internal drive performance management table 323, for example, correspondingly manages an "internal drive type" column 911, a "drive response [ms]" column 912, and a "drive IOPS [IOPS]" column 913.

The type of the storage device 222 installed in the first storage apparatus 101 is stored in the "internal drive type" column 911. For example, values such as SSD, SAS-HDD, SATA-HDD and so forth are stored in the column 911.

The response performance per unit of storage device 222 installed in the first storage apparatus 101 is stored in the "drive response [ms]" column 912. The response performance may be the response performance of the storage device 222 when the I/O load is low, or may be the average response performance of the storage device 222.

The throughput per unit of storage device 222 installed in the first storage apparatus 101 is stored in the "drive IOPS [IOPS]" column 913. The maximum number of I/Os that the storage device 222 is able to process per unit of time is stored in the column 913.

For example, the second row 914 of FIG. 9 shows that the response performance of the SSD installed in the first storage apparatus 101 is 1 ms, and that the throughput performance thereof is 1000 IOPS.

FIG. 10 shows the pool volume performance management table 324 for managing the performance of the pool volume. The pool volume performance management table 324 is updated by the tier management program 312.

The pool volume performance management table 324, for example, correspondingly manages a "pool volume ID" column 1011, an "attribute" column 1012, an "external storage ID" column 1013, a "drive type" column 1014, a "RAID level" column 1015, a "pool volume response" column 1016, and a "pool volume IOPS" column 1017.

Information (a pool volume ID) for identifying a pool volume is stored in the "pool volume ID" column 1011.

A value denoting the attribute of the pool volume is stored in the "attribute" column 1012. The attribute values are "external" and "internal". A case where the pool volume attribute is "internal" denotes that this pool volume is an internal volume configured using a drive (storage device 222) installed in the first storage apparatus 101. Alternatively, a case where the pool volume attribute is "external" denotes an external volume configured using a drive (storage device) installed in the external storage.

Information for identifying a storage apparatus coupled to the first storage apparatus 101 is stored in the "external storage ID" column 1013. Specifically, the apparatus ID of the second storage apparatus 102 is stored in the column 1013.

The type of the drive (storage device) of the pool volume is stored in the "drive type" column 1014. For example, SSD, SAS-HDD, SATA-HDD and the like are stored in the column 1014.

The RAID level of the pool volume is stored in the "RAID level" column 1015. For example, a value such as "3D+1P (RAID5)" or "6D+2P (RAID6)" is stored in the column 1015.

The response performance of the pool volume is stored in the "pool volume response" column 1016. The response performance, for example, may be the response performance when the I/O load is low, or the average response performance of the pool volume.

The throughput performance of the pool volume is stored in the "pool volume IOPS" column 1017. The maximum number of I/Os that the pool volume is able to process per unit of time is stored in the column 1017.

For example, the sixth row 1018 of FIG. 10 shows that the pool volume with the pool volume ID of "005" is configured from SAS-HDD having the external storage ID "EXT02", has a RAID level of "3D+1P", a pool volume response performance of 5 ms, and a pool volume throughput performance of 240 IOPS.

FIG. 11 shows the pool volume group management table 325 for managing a group of pool volumes. The pool volume group management table 325 is updated by the tier management program 312.

The pool volume group management table 325, for example, correspondingly manages a "pool ID" column 1111, a "pool volume ID" column 1112, an "external storage ID" column 1113, a "pool volume group name" column 1114, a "response [ms]" column 1115, an "IOPS [IOPS]" column 1116, an "external controller performance" column 1117, an "external path performance" column 1118, and an external tier IOPS column 1119.

Information (ID) for identifying a pool is stored in the "pool ID" column 1111. An ID of a pool volume that was sorted by the tier management program 312 is stored in the "pool volume ID" column 1112.

The ID of the second storage apparatus 102 coupled to the first storage apparatus 101 is stored in the "external storage ID" column 1113.

The name of the pool volume group that was sorted by the tier management program 312 is stored in the "pool volume group name" column 1114.

The response performance of the pool volume group sorted by the tier management program 312 is stored in the "response [ms]" column 1115. The response performance, for example, may be the response performance of the pool volume group when the I/O load is low, or may be the average response performance of the pool volume group.

The throughput performance of the pool volume group sorted by the tier management program 312 is stored in the "IOPS [IOPS]" column 1116. The maximum number of I/Os the pool volume group is able to process per unit of time is stored in the column 1116.

The CPU performance of the external storage (the performance of the controller 543 of the second storage apparatus 102) is stored in the "external controller performance" column 1117.

The port performance of the external storage (the performance of the communication port 542 of the second storage apparatus 102) is stored in the "external path performance" column 1118.

The throughput performance of the tier (this tier is called the external tier) configured from a pool volume group, which comprises at least one external pool volume, is stored in the "external tier IOPS" column 1119.

For example, the fourth row 1120 of FIG. 11 shows that a pool (A) is configured using a cluster of "pool volumes (005, 006, 007)", the pool volume group name is "external tier_A-1", the response performance of "external tier_A-1" is 5 ms, and the throughput performance of this external tier is 720 IOPS.

FIG. 12 shows the tier ranking management table 326 for managing the rank order of the tiers. The tier ranking management table 326 is updated by the tier ranking computation program 313.

The tier ranking management table 326, for example, correspondingly manages a "pool ID" column 1211, a "tier #" column 1212, a "pool volume group name" column 1213, and a "tier ranking determination criteria" column 1214.

A pool ID is stored in the "pool ID" column 1211. The rank order of a tier within the pool is stored in the "tier #" column 1212. The lower the numeral is, the higher the ranking. The name of a sorted pool volume group is stored in the "pool volume group name" column 1213. That is, a pool volume group name is stored in the column 1213 as information for identifying the pool volume group that is allocated to a tier.

The value of a performance indicator, which constitutes the criteria for deciding the rank order of a pool volume group, is stored in the "tier ranking determination criteria" column 1214. For example, in a case where the rank order of a pool volume group has been decided based on response performance, the response performance of the pool volume group is recorded in the column 1214. In a case where the rank order of a pool volume group has been decided based on throughput per capacity, the throughput per capacity of the pool volume group is recorded in the column 1214.

For example, the second row 1215 of FIG. 12 shows that the pool (A) tier name "SSD tier" has a ranking of 1, and that the response performance of this tier is 1 ms.

FIG. 13 shows the performance potential management table 327 for managing the performance potential. The performance potential management table 327 is updated by the performance potential computation program 314.

The performance potential management table 327, for example, correspondingly manages a "pool ID" column 1311, a "tier #" column 1312, a "pool volume group name" column 1313, and a "performance potential" column 1314.

A pool ID is stored in the "pool ID" column 1311. The rank order of a tier within the pool is stored in the "tier #" column 1312. The name of a pool volume group sorted by the tier ranking computation program 313 is stored in the "pool volume group name" column 1313.

A performance potential of the pool volume group is stored in the "performance potential" column 1314. The performance potential is the maximum performance (IOPS) capable of being processed per unit of time by this pool volume group.

For example, the second row 1315 of FIG. 13 shows that the performance potential of the pool (A) SSD tier is XXX IOPS.

FIG. 14 shows the pool volume response curve management table 328 for managing the result of measuring the response curve of the pool volume. The pool volume response curve management table 328 is updated by the external storage information acquisition program 311.

The pool volume response curve management table 328, for example, correspondingly manages a "pool volume ID" column 1411, an "IOPS" column 1412, and a "response time" column 1413.

The ID of a measured pool volume is stored in the "pool volume ID" column 1411. The load of a test I/O issued to the pool volume is stored in the "IOPS" column 1412. The load, for example, is the number of I/Os per unit of time. A response time in a case where a test I/O was issued to the pool volume is stored in the "response time" column 1413.

For example, the second row 1414 of FIG. 14 shows a response performance of 1 ms when a one IOPS test I/O was issued to the pool volume (001).

FIG. 15 shows the tier response curve management table 329 for managing the response curve of a tier. The tier response curve management table 329 is updated by the tier management program 312.

The tier response curve management table 329, for example, correspondingly manages a "pool ID" column 1511, a "tier #" column 1512, a "pool volume group name" column 1513, an "IOPS" column 1514, and a "response time [ms]" column 1515.

The ID of a pool is stored in the "pool ID" column 1511. The rank order of a tier is stored in the "tier #" column 1512. The name of a sorted pool volume group is stored in the "pool volume group name" column 1514.

The value of an I/O load placed on a tier is stored in the "IOPS" column 1514 as the number of I/Os per second. The response time with respect to the I/O load is stored in the "response time [ms]" column 1515.

For example, the second row 1516 of FIG. 15 shows a response time of 1 ms when a load of 1 IOPS was placed on the SSD tier, which is the tier with a ranking of 1 in pool (A).

Figure 16:
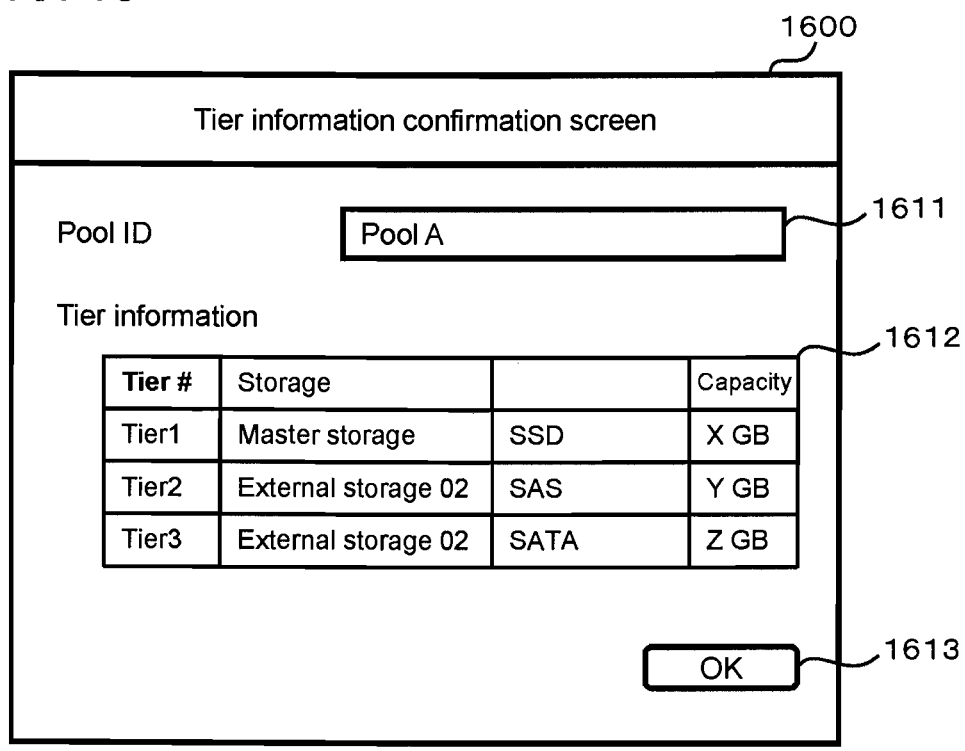
FIG. 16 shows an example of a screen for confirming tier information.

FIG. 16 shows the tier information confirmation screen 1600 displayed by the management computer 104. The tier information confirmation screen 1600 is a screen for the administrator to confirm tier information, and is displayed on the output device 417 of the management computer 104.

The tier information confirmation screen 1600, for example, comprises a pool ID output part 1611, a tier information output part 1612, and a button 1613.

The pool ID output part 1611 displays the ID of a pool disposed in the first storage apparatus 101.

The information of the tier defined by the tier ranking computation program 313 of the first storage apparatus 101 is output in the tier information output part 1612. For example, a storage type, a drive type, and a tier capacity are output in the tier information output part 1612 for each tier number. The storage types are "master storage" and "external storage". The "master storage" is the storage apparatus that uses a logical volume inside another storage apparatus, and in this example, corresponds to the first storage apparatus 101. The "external storage" is the storage apparatus that provides the logical volume, and in this example, corresponds to the second storage apparatus 102. The "drive type" is the type of storage device that provides the physical storage area to the pool volume configuring the tier.

The button 1613 is for terminating the screen. The administrator, after confirming the tier information of the pool, operates the button 1613 when terminating the display of this screen.

The CPU 212 of the first storage apparatus 101 sends the tier information for each pool to the management computer 104 subsequent to deciding the tier rankings. The CPU 411 of the management computer 104 executes the management communication program 422 and receives the tier information of each pool from the first storage apparatus 101. The management computer 104 executes the UI control program 421, creates a tier information confirmation screen 1600, and provides this screen to the administrator.

The various processing carried out by this example will be explained in detail below. Each flowchart shows an overview of each process to the extent necessary to understand and implement this example. The sequence of the steps is not limited to the sequence shown in the drawings. Furthermore, a so-called person with ordinary skill in the art will be able to add a new step, or change or delete a portion of the steps. A step will be abbreviated as "S" in the following explanations.

Figure 17:
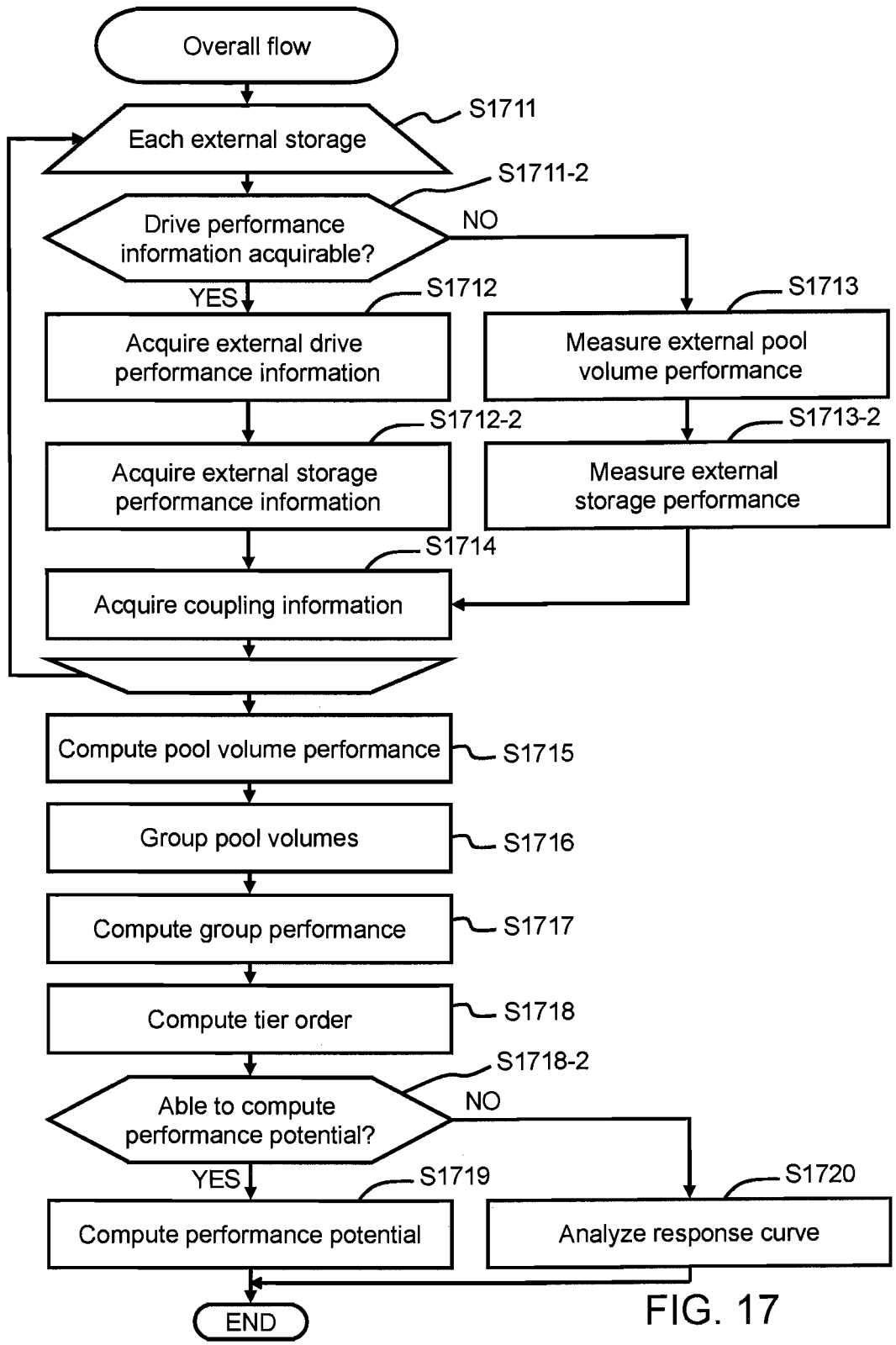
FIG. 17 is a flowchart showing the overall flow of processing.

FIG. 17 is a flowchart showing the overall flow of processing of this example. This processing may start at the time a pool is created, or may start in accordance with being triggered by an instruction from the administrator.

In this example, two types of methods for acquiring the performance information of the external storage will be explained, i.e., a method for acquiring this information from the management computer 104, and a method for acquiring this information by the first storage apparatus 101 making measurements. The present invention is not limited to these methods, and the configuration may be such that the first storage apparatus 101 stores the external storage performance information in a table in advance.

The external storage information acquisition program 311 executes S1711, S1711-2, S1712, S1712-2, S1713, S1713-2 and S1714. The tier management program 312 executes S1715, S1716, and S1717. The tier ranking computation program 313 executes S1718. The performance potential computation program 314 executes S1718-2, S1719, and S1720.

The external storage information acquisition program 311 respectively executes S1711-2, S1712, S1712-2, S1713, S1713-2 and S1714 for each external storage (second storage apparatus) whose existence is recognized by the management computer 104. The external storage information acquisition program 311 decides on the ID of one external storage to be the processing target (S1711).

The external storage information acquisition program 311 determines whether drive performance information can be acquired for the processing-target external storage (S1711-2). The drive performance information is information showing the performance of the storage device (can be called the external drive) of the external storage.

In a case where the external drive performance information is able to be acquired from the management computer 104 (S1711-2: YES), the external storage information acquisition program 311 executes a process for acquiring the performance information of the external drive (S1712), and a process for acquiring the performance information of the external storage (S1712-2). The process for acquiring the performance information of the external drive will be explained in detail further below using FIG. 18. The process for acquiring the performance information of the external storage will be explained in detail further below using FIG. 19.

In a case where the external drive performance information is unable to be acquired from the management computer 104 (S1711-2: NO), the external storage information acquisition program 311 executes a process for measuring the performance of the external pool volume (S1713), and a process for measuring the performance of the external storage (S1713-2). The process for measuring the performance of the external pool volume will be explained in detail further below using FIG. 20. The process for measuring the performance of the external storage will be explained in detail further below using FIG. 21.

In the case of all determination results of Step S1711-2, the external storage information acquisition program 311 executes a process for acquiring the coupling information of the external storage subsequent to obtaining the required information (S1714). The process for acquiring the external storage coupling information will be explained in detail further below together with FIG. 22.

In a case where there is an external storage that has not been processed, the external storage information acquisition program 311 returns to S1711 and repeats the steps described above. When the processing for all the external storages managed by the management computer 104 is complete, the program 311 moves to S1715.

The tier management program 312 executes a process for computing the performance of the pool volume using the performance values acquired in either S1712 and S1712-2, or S1713 and S1713-2 (S1715). The process for computing the pool volume performance will be explained in detail further below together with FIG. 23.

The tier management program 312 executes a process for sorting the pool volumes using the performance value of each computed pool volume (S1716). That is, the tier management program 312 groups together the respective pool volumes in accordance with the performance value of each volume. The process for grouping the pool volumes will be explained in detail further below together with FIG. 24.

The tier management program 312 executes a process for computing the performance of the pool volumes for each of the sorted pool volume groups (S1717). The tier management program 312 computes the performance of a pool volume group based on the performance information of each volume acquired in either S1712 and S1712-2 or S1713 and S1713-2 (S1717). This processing will be described in detail further below using FIG. 25.

The tier ranking computation program 313 executes a process for computing the tier ranking of each pool volume group using the performance value of each pool volume computed in S1717 (S1718). The process by which the tier ranking computation program 313 computes a tier ranking using the performance of the pool volume group will be explained in detail further below together with FIG. 26.

The performance potential computation program 314 determines whether a performance potential for each pool volume group can be computed using the pool volume group performance value computed in S1717 (S1718-2).

In a case where the performance potential is able to be computed (S1718-2: YES), the performance potential computation program 314 implements a process for computing the performance potential (S1719). The process for computing the performance potential will be explained in detail further below together with FIG. 27.

In a case where the performance potential is unable to be computed (S1718-2: NO), the performance potential computation program 314 implements a process for analyzing the response curve acquired in S1713 and S1713-2 (S1720). The process for analyzing the response curve will be explained in detail further below together with FIG. 28.

Furthermore, the tier ranking and performance potential, for example, are likely to fluctuate diversely in accordance with the degree of congestion on the communication network and the addition or removal of a pool volume. The process for dealing with a configuration change like this will be explained together with FIG. 29.

In addition, the data of a page allocated to the virtual volume 511 is migrated to a page inside a more appropriate tier in accordance with the I/O frequency of each page. The page migration process will be described in detail further below using FIG. 30.

Figure 18:
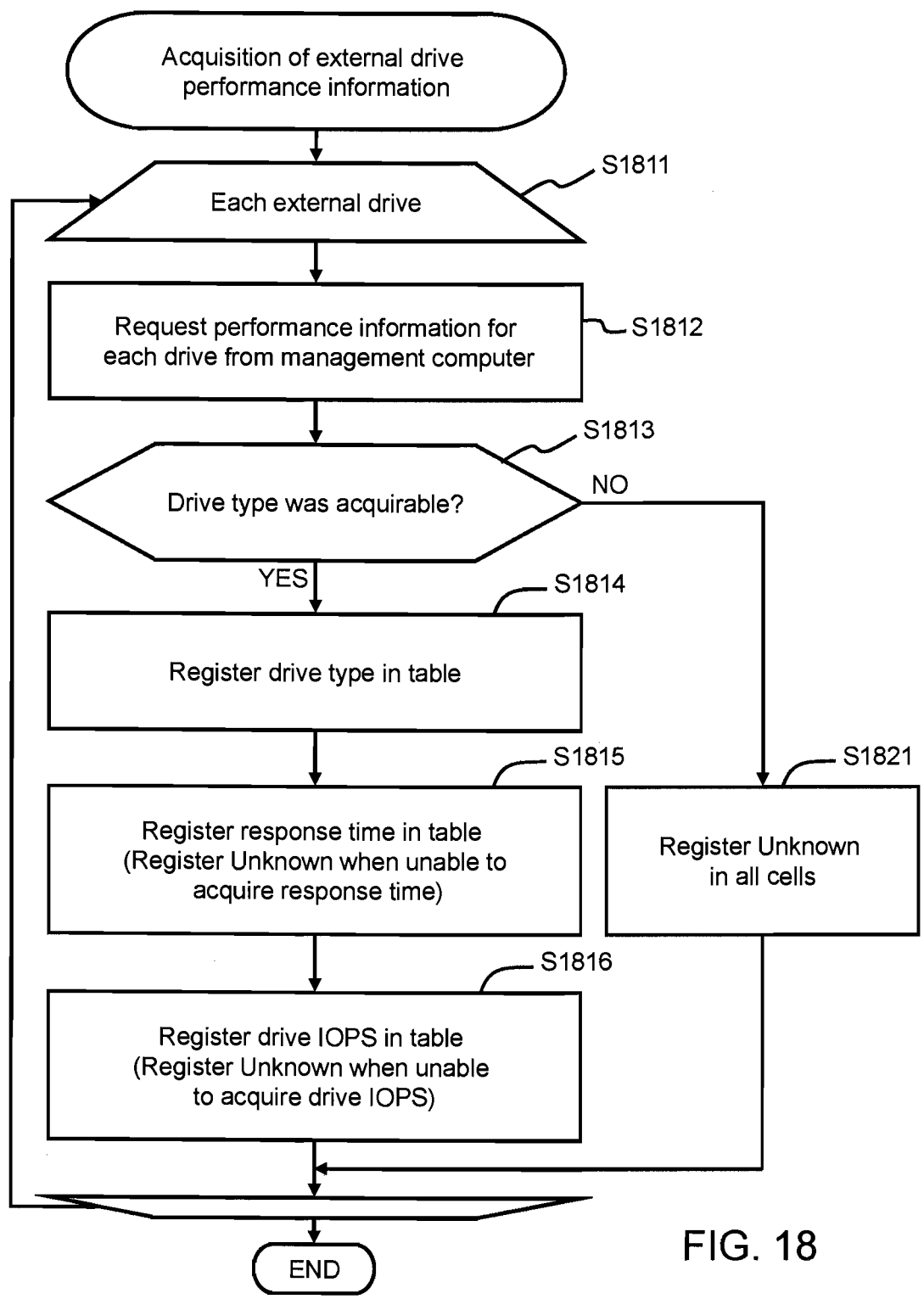
FIG. 18 is a flowchart showing a process for acquiring external drive performance information.

FIG. 18 is a flowchart showing the process (S1712) for acquiring the performance information of the external drive. The external storage information acquisition program 311 executes the below-described S1812, S1813, S1814, S1815, S1816, and S1821 for each external drive (S1818). Specifically, the external storage information acquisition program 311 adds an entry column to the external drive performance management table 320 in which the ID of the processing-target external storage is stored in the external storage ID 611.

The external storage information acquisition program 311 issues a request to the management computer 104 for the performance information of a drive for each drive (external drive) of the processing-target external storage (S1812).

The external storage information acquisition program 311 determines whether the drive type is included in the performance information acquired from the management computer 104 (S1813). In a case where the external drive type was able to be acquired (S1813:YES), the external storage information acquisition program 311 stores the drive type acquired in S1813 in the drive type 612 of the entry row added in S1811 (S1814).

The external storage information acquisition program 311, in a case where the response time is included in the performance information acquired from the management computer 104, stores this response time in the drive response 613 (S1815). In a case where the response time is not included in the performance information acquired from the management computer 104, "Unknown" is configured in the drive response 613.

The external storage information acquisition program 311, in a case where the throughput performance (drive IOPS) of the external drive is included in the performance information acquired from the management computer 104, stores this throughput performance in the throughput performance 614 (S1816). In a case where the throughput performance of the external drive is not included in the performance information acquired from the management computer 104, "Unknown" is configured in the throughput performance 614.

Meanwhile, in a case where the drive type is not included in the performance information requested from the management computer 104 (S1813: NO), "Unknown" is stored in all of the cells in the entry row added in S1811 (S1821). Since the drive type is basic information, in a case where the management computer 104 is unable to acquire even the drive type from the external storage, it is conceivable that response time and throughput performance will also unacquirable. Therefore, "Unknown" is configured in each cell of the added entry row.

Figure 19:
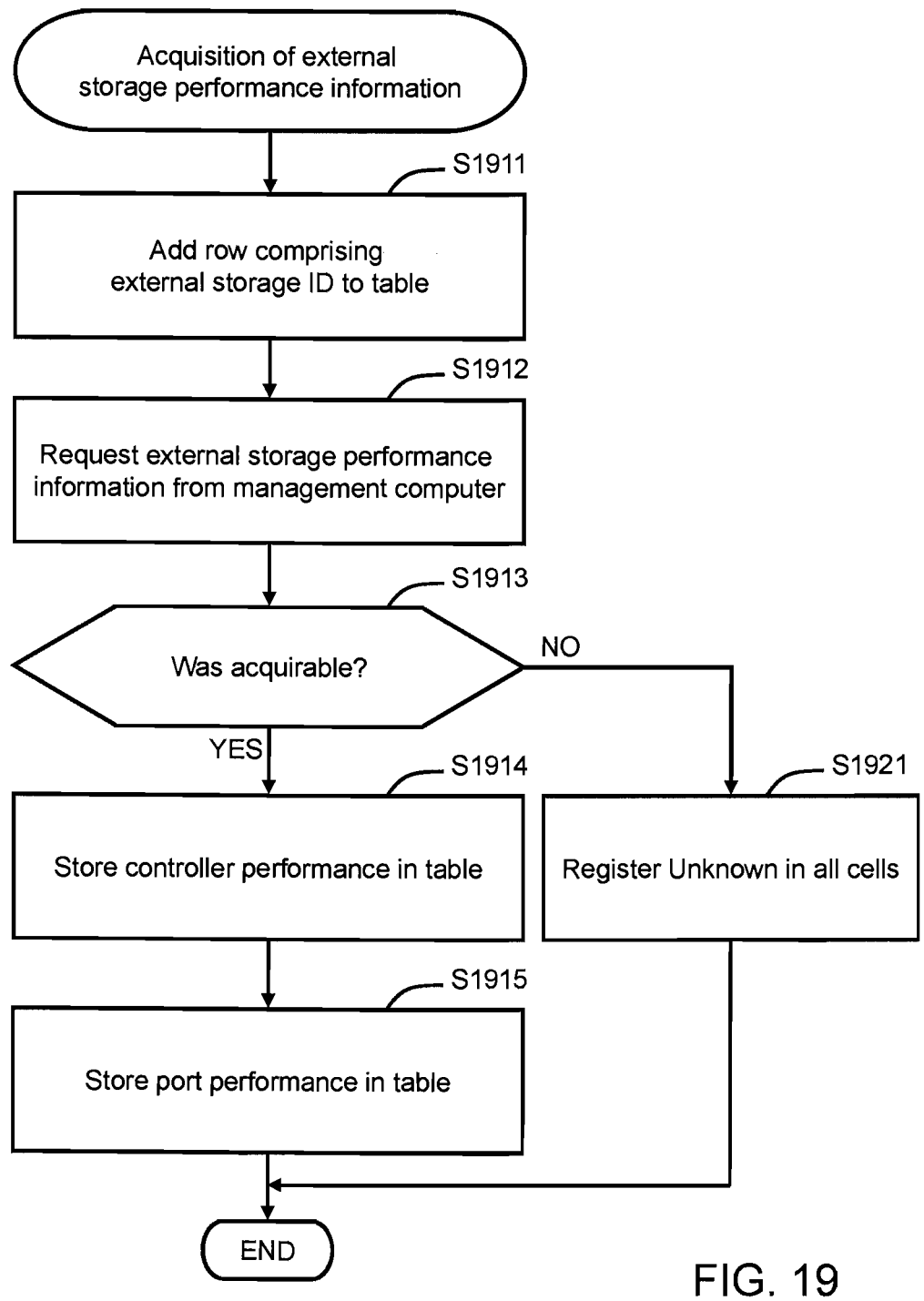
FIG. 19 is a flowchart showing a process for acquiring external storage performance information.

FIG. 19 is a flowchart showing the process (S1712-2) for acquiring the performance information of the external storage.

The external storage information acquisition program 311 adds an entry row to the external storage performance management table 321 in which the ID of the processing-target external storage is stored in the external storage ID 711.

The external storage information acquisition program 311 issues a request to the management computer 104 for the performance information of the processing-target external storage (S1912).

The external storage information acquisition program 311 determines whether the performance information can be acquired from the management computer 104 (S1913). In a case where the external storage performance information is acquirable from the management computer 104 (S1913: YES), the external storage information acquisition program 311 stores the value of the acquired controller performance in the controller performance 712 of the entry row added in S1911 (S1914). Similarly, the external storage information acquisition program 311 stores the value of the acquired port performance in the port performance 713 of the entry row added in S1911 (S1915).

In a case where the requested performance information cannot be acquired from the management computer 104 (S1913: NO), the external storage information acquisition program 311 stores "Unknown" in all the cells of the above-mentioned added entry row (S1921).

Figure 20:
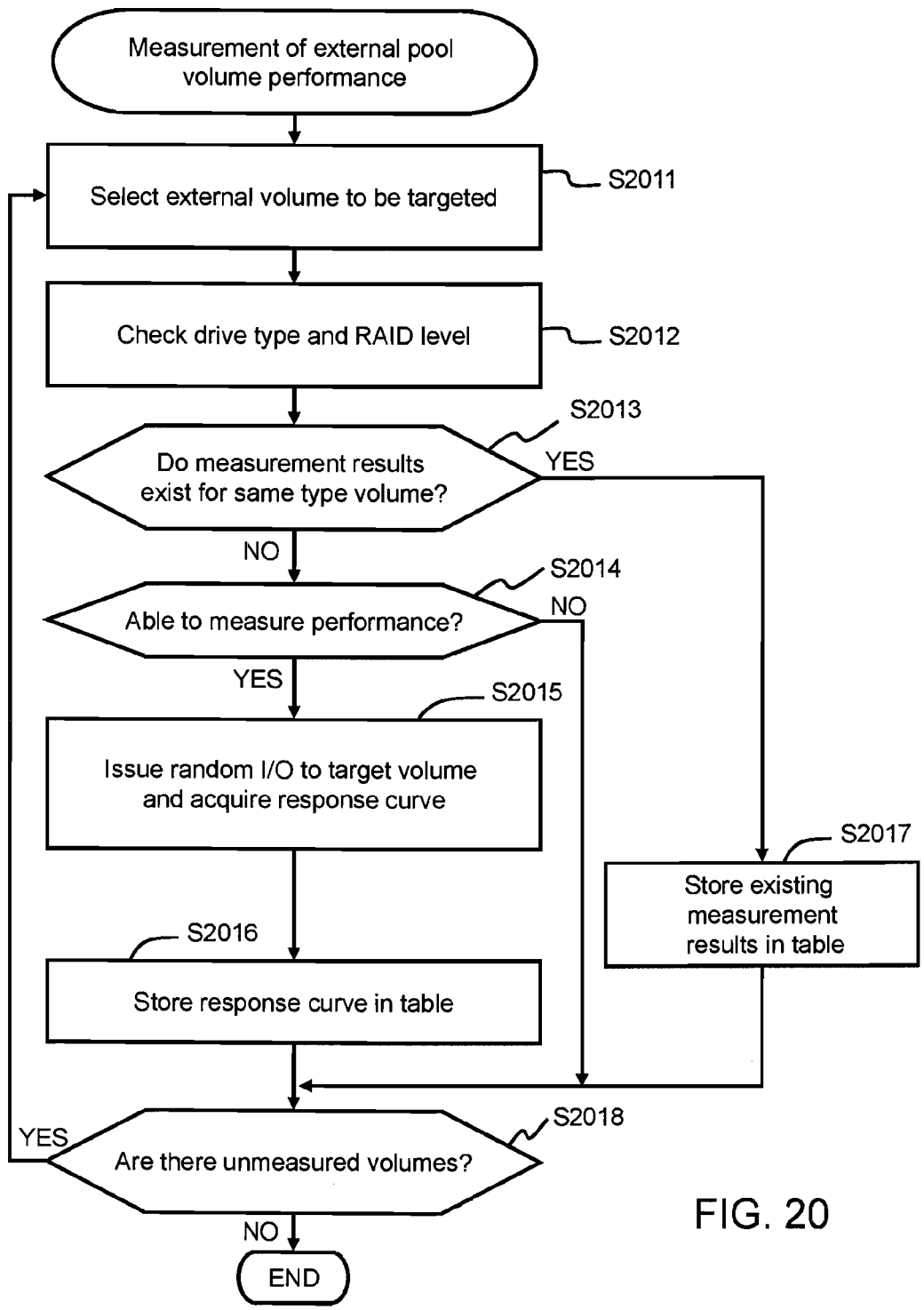
FIG. 20 is a flowchart showing a process for measuring the performance of an external volume (externally coupled volume).

FIG. 20 is a flowchart showing the process (S1713) for measuring the performance of the external pool volume.

The external storage information acquisition program 311 selects as the measuring-target volume any one of the external pool volumes of the processing-target external storage selected in S1711 (S2011).

The external storage information acquisition program 311 checks the drive type and the RAID level of the measuring-target external pool volume (S2012).

As a result of the check, the external storage information acquisition program 311 determines whether or not performance measurement results are already being stored for an external pool volume having the same drive type and the same RAID level (S2013). The determination step of S2013 is provided to prevent duplicate performance measurements from being carried out for the same type external pool volume.

In a case where measurement results for an external pool volume of the same drive type and the same RAID level do not exist (S2013: NO), the external storage information acquisition program 311 determines whether or not performance can be measured by issuing a test I/O to the measuring-target external pool volume (S2014).

For example, in a case where a command from the host computer 103 is being processed with respect to data stored in the measurement-target pool volume, the external storage information acquisition program 311 can make the determination that performance measurement is not possible. This is because measuring the performance of the external pool volume being used by the host computer 103 will likely affect the business processing being executed by the host computer 103. In addition, in a case where either a failure has occurred in the external pool volume or a failure recovery process is being executed with respect to the external pool volume, the external storage information acquisition program 311 can make a determination that it is not possible to measure performance.

In a case where the determination is that external pool volume performance can be measured (S2014: YES), the external storage information acquisition program 311 measures the performance of the measurement-target external pool volume (S2015).

For example, the external storage information acquisition program 311 issues a random I/O to the measurement-target external pool volume while changing the load (IOPS) level, and measures the response time with respect to this random I/O for each load level. This makes it possible to acquire a response curve, which is a characteristic showing the relationship between load (IOPS) and response time (S2015).

The external storage information acquisition program 311 records the measurement results in the pool volume response curve management table 328 (S2016).

Alternatively, in a case where performance measurement results already exist for an external pool volume having the same drive type and same RAID level (S2013: YES), the external storage information acquisition program 311 records the existing performance measurement results in the pool volume response curve management table 328 (S2017). This is because it can be assumed that the existing measurement results will be the same as the measurement results that could have been obtained from the measurement-target external pool volume.

Thus, using existing measurement results as much as possible precludes carrying out wasteful performance measurements. Therefore, the first storage apparatus 101 only has to issue the minimum test I/Os with respect to the external pool volume inside the second storage apparatus 102, can inhibit communication network 112 congestion, and can prevent increasing the processing loads of the controller 211 and the controller 543.

Furthermore, S2013 may be removed from the flowchart of FIG. 20 to prevent a duplicate performance measurement. That is, the configuration may be such that test I/Os are issued to all the external pool volumes.

When either measuring or acquiring the performance of the external pool volume, the external storage information acquisition program 311 determines whether there is an external pool volume for which performance has not yet been measured (S2018). In a case where an unmeasured external pool volume exists (S2018:YES), the external storage information acquisition program 311 returns to S2011 and repeats the steps described hereinabove. Furthermore, in a case where the performance of the measurement-target external pool volume cannot be measured (S2014: NO), the external storage information acquisition program 311 moves to S2018.

Figure 21:
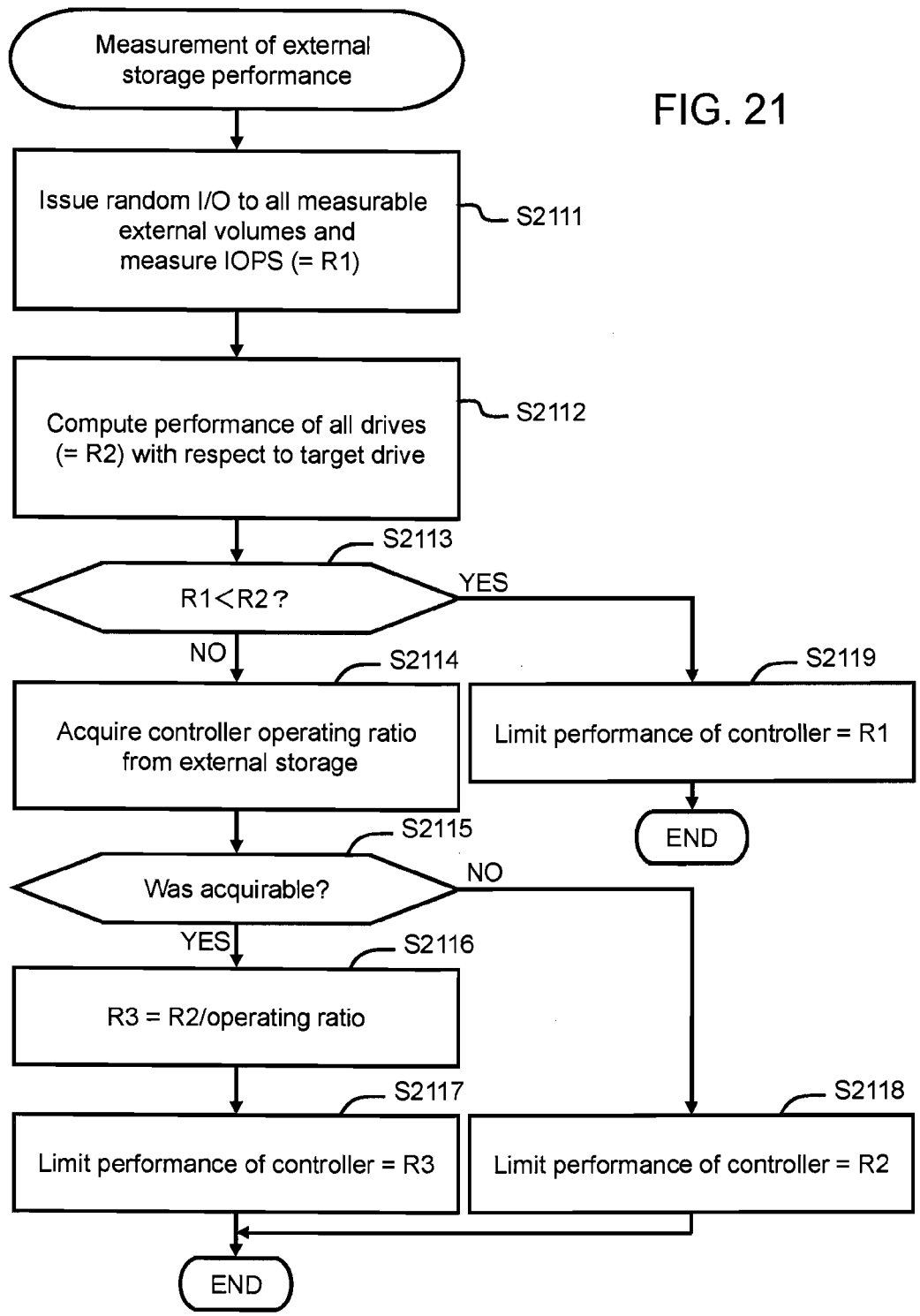
FIG. 21 is a flowchart showing a process for measuring the performance of an external storage.

FIG. 21 is a flowchart showing the process (S1713-2) for measuring the performance of the external storage.

The external storage information acquisition program 311 simultaneously issues random I/Os to all the performance-measurable pool volumes among the pool volumes included in the processing-target external storage selected in S1711 (S2111). The external storage information acquisition program 311 increases the random I/O load until the performance limit of each measurement-target external pool volume is detected (S2111). The external storage information acquisition program 311 holds the detected performance limit as a "measurement result R1" (S2111).

The performance limit is the load (IOPS) when a response to a command suddenly worsens. When a quantity of commands too large to process has been issued, these commands accumulate in an unprocessed queue and response time increases much more than at normal times.

Next, the external storage information acquisition program 311 individually issues a random I/O to each measurement-target external pool volume in S2111 until the performance limit can be identified (S2112). Furthermore, the performance result for each pool volume measured in S2015 may be used as the performance limit of each external pool volume that is a measurement target in S2111. The external storage information acquisition program 311 totals the performance limits of the respective external pool volumes, and holds the totaled value as a "total drive performance (R2)" (S2112).

The external storage information acquisition program 311 compares the measurement result (R1) found in S2111 to the total drive performance (R2) found in S2112, and determines whether the measurement result (R1) is smaller than the total drive performance (R2) (S2113).

In a case where the measurement result (R1) is smaller (S2113: YES), the external storage information acquisition program 311 records the "measurement result (R1)" in the controller performance 712 of the external storage performance management table 321 as the controller performance limit (S2119).

Although the response performance in a case where random I/Os were simultaneously issued to the respective external pool volumes until the performance limit of each external pool volume has been reached will differ in accordance with the number of external pool volumes, this response performance will be affected by the performance of the controller 543 of the external storage apparatus 102. This is because the simultaneously issued random I/Os are applied to the respective external pool volumes through the controller 543. By contrast, in a case where the random I/Os are issued to each external pool volume until this performance limit is reached, the affects of the controller 543 will be small. This is because the load of the random I/Os going through the controller 543 is small.

As a simple example to facilitate understanding, for example, it is supposed that there are 10 measurement-target external pool volumes, and that the measurement result (R1) in a case where random I/Os were issued to the 10 external pool volumes until there performance limits were reached was 800 IOPS. Alternatively, in a case where the performance limit of each external pool volume is 100 IOPS, the total drive performance (R2) will be 1000 IOPS (=100×10).

In accordance with this, the measurement result R1 (=800 IOPS) is smaller than the total drive performance R2 (=1000 IOPS). That is, the external storage controller 543 is shown to be a bottleneck. Consequently, the measurement result (R1) will be used as the performance limit of the external storage controller 543.

Alternatively, in a case where the measurement result (R1) is larger than the total drive performance (R2) (S2113: NO), the external storage information acquisition program 311 acquires the controller operating rate from the external storage (S2114). The controller operating rate is information showing the rate at which the external storage controller 543 is operating.

A determination is made as to whether the controller operating rate can be acquired from the external storage (S2115). In a case where the controller operating rate cannot be acquired (S2115: NO), the external storage information acquisition program 311 can record the total drive performance (R2) in the controller performance 712 of the external storage performance management table 321 as the performance limit of the controller (S2118).

In a case where the controller operating rate can be acquired (S2115: YES), the external storage information acquisition program 311 divides the total drive performance (R2) by the controller operating rate to obtain a computation result R3 (S2116). The external storage information acquisition program 311 can record the computation result R3 (=R2/controller operating rate) in the controller performance 712 of the external storage performance management table 321 as the performance limit of the external storage controller 543 (S2117).

A case in which the measurement result (R1) is larger than the total drive performance (R2) indicates that the external storage controller 543 has throughput to spare. To more accurately compute the performance limit of the controller 543, the operating rate of the controller 543 is acquired, and the total drive performance (R2) is divided by the controller operating rate.

Furthermore, the external storage information acquisition program 311, in a case where information related to the path performance 713 of the external storage performance management table 321 could be acquired from the external storage when acquiring the controller operating rate, can store this information in the column 713. In a case where it was not possible to acquire the path performance-related information (information related to port performance), "Unknown" can be stored in the column 713.

Figure 22:
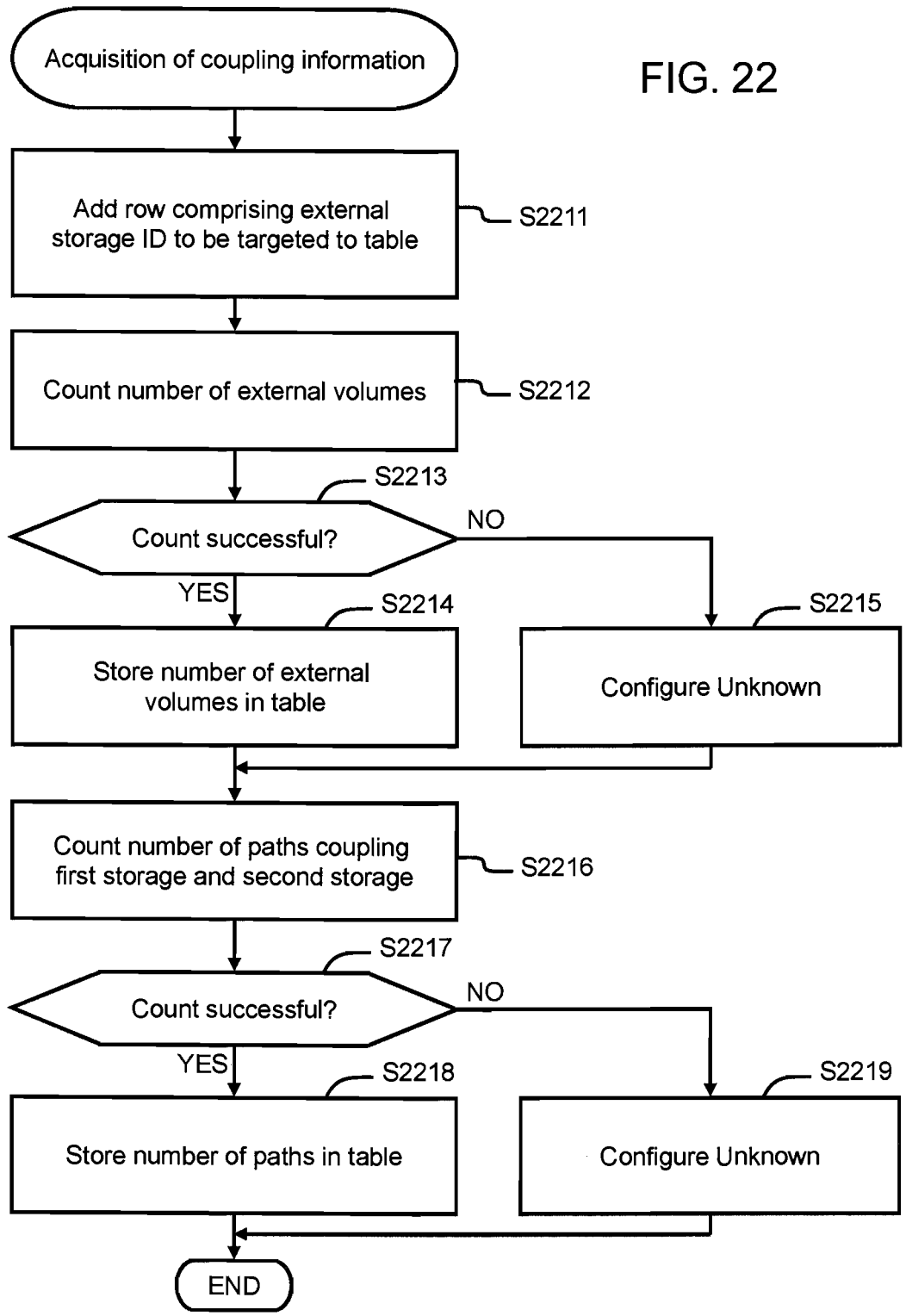
FIG. 22 is a flowchart showing a process for acquiring coupling information denoting the coupling relationship between a first storage apparatus and a second storage apparatus (external storage apparatus).

FIG. 22 is a flowchart showing the process (S1714) for acquiring the coupling information of the external storage.

The external storage information acquisition program 311 adds one row to the external storage management table 322, and stores the ID of the processing-target external storage in the external storage ID 811 of this row (S2211).

The external storage information acquisition program 311 counts the number of external pool volumes being provided from the processing-target external storage (S2212). That is, the external storage information acquisition program 311 detects, from among the logical volumes in the second storage apparatus 102, which is the external storage, the number of volumes (external pool volumes) coupled to the externally coupled volume in the first storage apparatus 101.

The external storage information acquisition program 311 determines whether the external pool volume count succeeded (S2213). In a case where the count succeeded (S2213: YES), the external storage information acquisition program 311 stores the count value in the number of coupling volumes 812 of the row added in S2211 (S2214). In a case where the count failed (S2213: NO), "Unknown" is stored in the number of coupled volumes 812 (S2215).

The external storage information acquisition program 311 counts the number of communication paths coupling the processing-target external storage (second storage apparatus 102) and the first storage apparatus 101 (S2216).

In a case where the number of communication paths count succeeded (S2217: YES), the external storage information acquisition program 311 stores this number of communication paths in the number of paths 813 in the row added in S2211 of the external storage management table 322 (S2218). In a case where the number of communication paths count failed (S2217: NO), "Unknown" is stored in the number of paths 813 (S2219).

Figure 23:
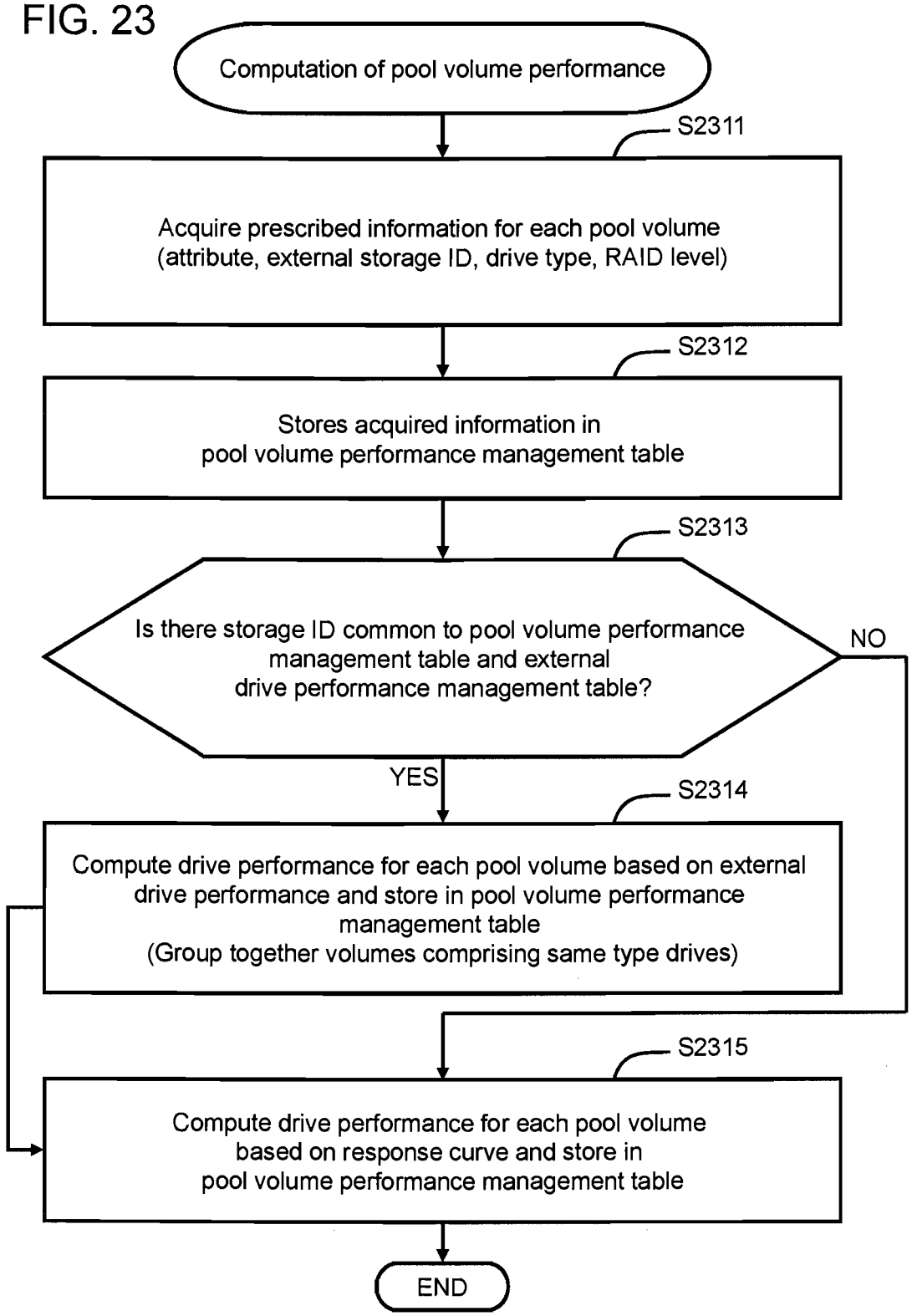
FIG. 23 is a flowchart showing a process for computing the performance of a pool volume.

FIG. 23 is a flowchart showing the process (S1715) for computing the performance of the pool volume.

The tier management program 312 acquires the pool volume IDs of all the pool volumes, and acquires prescribed information for each pool volume (S2311). As the prescribed information, for example, there is the volume attribute (internal volume or external volume), ID of the storage to which the pool volume belongs, the drive type, and the RAID level. The tier management program 312 stores the acquired prescribed information in the row that was added in the pool volume performance management table 324 (S2312).

The tier management program 312 determines whether an external storage ID exists in both the pool volume performance management table 324 and the external drive performance management table 320 (S2313). That is, the tier management program 312 determines whether or not the management computer 104 is able to acquire the external drive-related information from the external storage.

In a case where there is an external storage ID common to each of tables 324 and 320 (S2313: YES), the tier management program 312 uses the information of the external drive performance management table 320 to compute the drive performance for each pool volume, and stores this drive performance in the pool volume performance management table 324 (S2314).

For example, the tier management program 312 stores the value of the drive response 613 of the external drive performance management table 320 in the pool volume response 1016 of the rows in which the external storage ID (611 and 1013) and the drive type (612 and 1014) respectively match (S2314).

In addition, the tier management program 312 multiplies the number of data disks denoted in the RAID level 1015 of the rows in which the external storage ID (611 and 1013) and the drive type (612 and 1014) match by the value of the drive IOPS 614 of the external drive performance management table 320. For example, in a case where the RAID level is "3D+1P", the number of data disks is three. The value obtained by multiplying the drive IOPS by the number of data disks denotes the throughput performance of the pool volume. Therefore, the tier management program 312 stores the computed value in the pool volume IOPS 1017 as the pool volume throughput (S2314).

Furthermore, the method for computing the volume performance (response and throughput) described in S2314 is an example, but the present invention is not limited to the above-described method.

In a case where there is no external storage ID common to each of the tables 324 and 320 (S2313: NO), the tier management program 312 computes the drive performance for each pool volume based on the pool volume response curve management table 328 (S2315).

For example, the tier management program 312 selects, from among the response times of the same pool volume ID in the pool volume response curve management table 328, the smallest response time as the response time of this pool volume. The tier management program 312 stores this selected response time in the pool volume response 1016 of the rows in which the pool volume IDs (1411 and 1011) match (S2315). Furthermore, the tier management program 312, for example, regards the throughput value of the value that exceeds a certain fixed response time from among the response times of the same pool volume ID in the pool volume response curve management table 328, as the throughput of this pool volume, and stores this value in the pool volume IOPS 1017 (S2315).

Furthermore, in a case where it is either not possible to measure or compute the response performance of the pool volume, "Unknown" can be stored in the pool volume IOPS 1017.

In addition, the drive performance of the internal pool volume can be found using the same method as that described in S2314 by using the internal drive performance management table 323 instead of the external drive performance management table 320.

Figure 24:
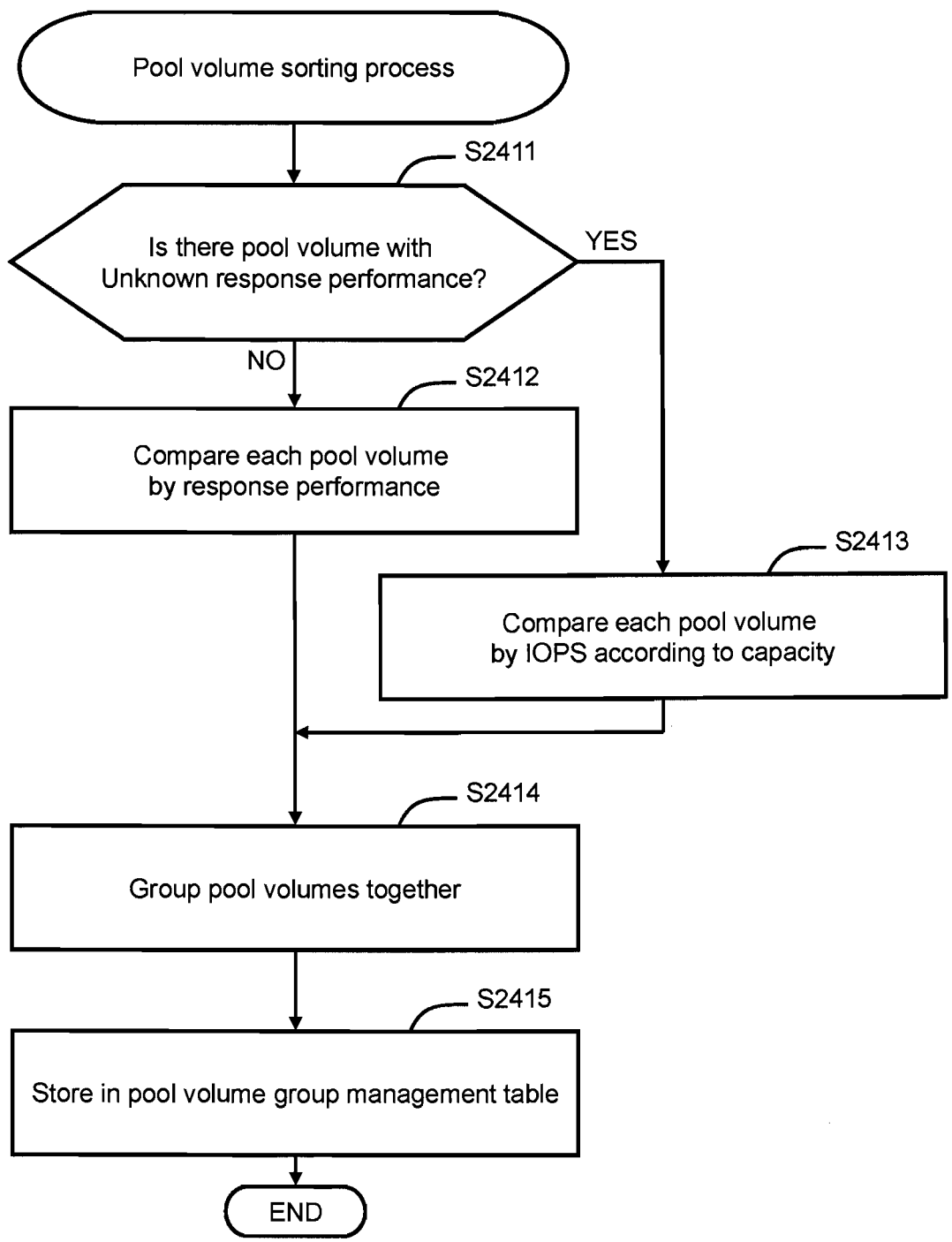
FIG. 24 is a flowchart showing a process for grouping pool volumes.

FIG. 24 is a flowchart showing the process (S1716) for grouping the pool volumes.

The tier management program 312 determines whether there is a pool volume for which the value of the pool volume response 1016 of the pool volume performance management table 324 is "Unknown" (S2411).

In a case where there are no pool volumes for which "Unknown" is stored in the value of the pool volume response 1016 (S2411: NO), the tier management program 312 compares each pool volume based on the value of the pool volume response 1016 (S2412).

In a case where "Unknown" exists in even one of the values of the pool volume response 1016 (S2411: YES), the tier management program 312 can compare the respective pool volumes based on the IOPS per capacity (S2413). That is, the tier management program 312 can divide the pool volume IOPS 1017 by the capacity of the pool volume, compute the IOPS per capacity, and compare the size of this IOPS per capacity among the respective pool volumes.

Furthermore, in this example, in a case where the pool volume response 1016 is "Unknown", the value of the pool volume IOPS 1017 is inputted.

The tier management program 312 sorts the pool volumes based on the result of either S2412 or S2413 (S2414). In this example, sorting is grouping the same pool volumes on the basis of a specific perspective. The sorting method includes the following methods. The following sorting methods are examples, and the present invention is not limited to these methods.

(1) First Sorting Method

A first sorting method is based on the internal pool volume. In the first sorting method, the pool volumes are arranged in order of performance, the response performance of the internal pool volume is used as a reference value, and external pool volumes with response performance that is higher than the reference value and external pool volumes with response performance that is lower than the reference value, respectively, are grouped together.

(2) Second Sorting Method

A second sorting method is based on capacity. In the second sorting method, pool volumes with similar response performance are gathered together and formed into groups such that the capacities of the respective pool volume groups becomes substantially the same.

(3) Third Sorting Method

A third sorting method is one that performs sorting by focusing on the origins of the pool volumes. In the third sorting method, pool volumes having the ID of the storage apparatus to which the pool volume belongs and the drive type in common are grouped together.

The tier management program 312 records the results of the sorting in S2414 in the pool volume group management table 325. The configuration may be such that at the point in time at which a created pool volume group is recorded in the pool volume group management table 325, the name of the pool volume group can be saved in the column 1114 of table 325.

Furthermore, a case in which the first storage apparatus 101 automatically sorts the respective pool volumes has been described, but instead of this, the configuration may be such that the first storage apparatus 101 sorts the pool volumes based on administrator-instructed sorting information.

Figure 25:
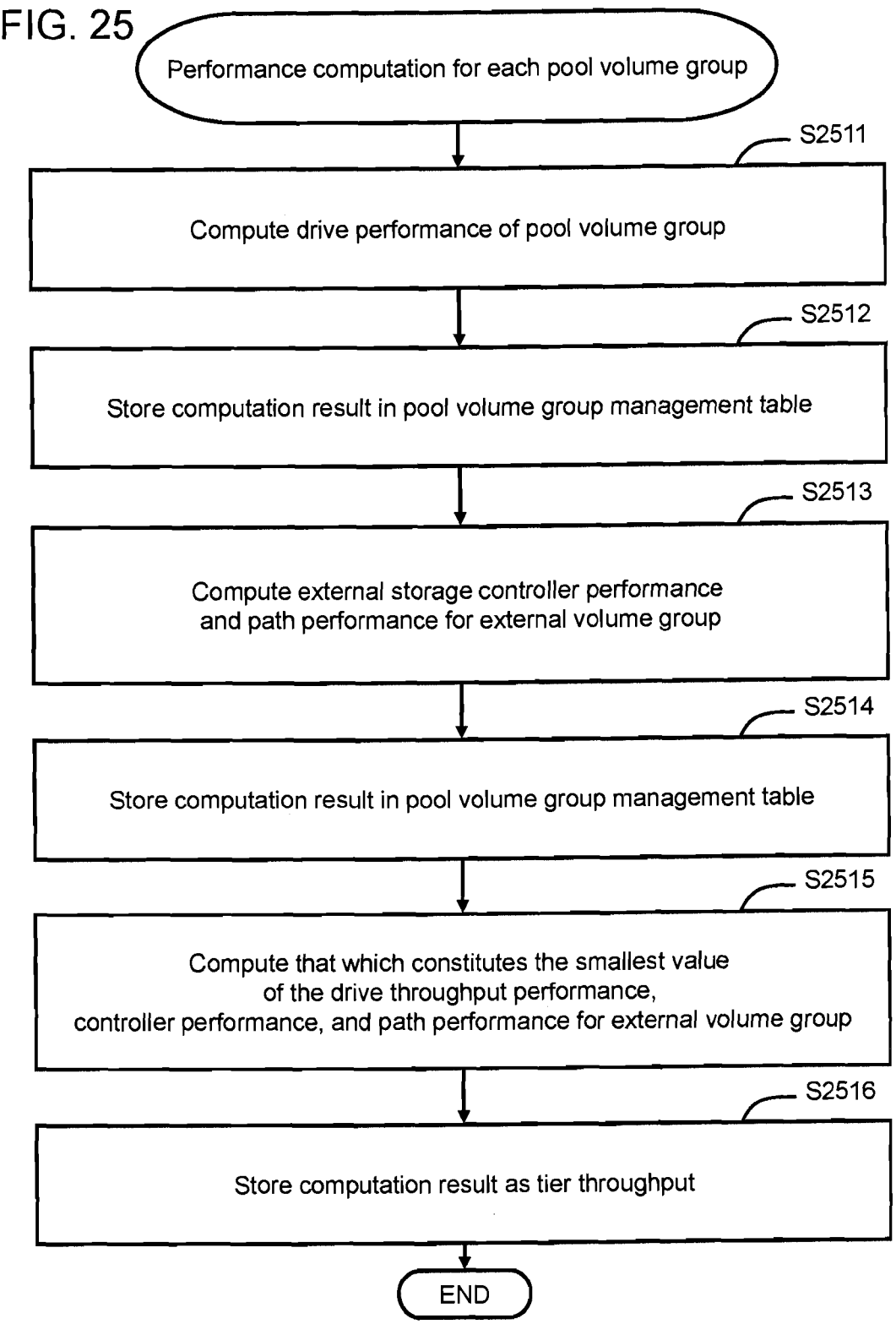
FIG. 25 is a flowchart showing a process for computing the performance of each pool volume group.

FIG. 25 is a flowchart showing the process (S1717) for computing the performance of each pool volume group.

The tier management program 312 computes the drive performance of each pool volume group based on the performance information of the pool volume performance management table 324 and the information of the pool volume group management table 325 (S2511).

The tier management program 312 stores the computed drive performance of each pool volume group in the pool volume group management table 325 (S2512).

For example, the tier management program 312 can compute the average of the values of the pool volume responses 1016 of the pool volume performance management table 324 for each pool volume group, and can stored this average value in the response 1115 of the pool volume group management table 325 (S2512). Furthermore, besides the average value, for example, the response performance of the pool volume group may be the lowest value of the values of the pool volume responses 1016 belonging to the same pool volume group.

In addition, the tier management program 312 can total the pool volume IOPS 1017 of the pool volume performance management table 324 for each pool volume group, and can stored this total value in the IOPS 1116 of the pool volume group management table 325 (S2512).

Furthermore, in a case where the performance of the pool volume group cannot be computed because "Unknown" is stored in the pool volume performance management table 324, "Unknown" can be configured in the response 1115 and the IOPS 1116.

The tier management program 312 computes the controller performance and the path performance of the external storage based on the performance information of the external storage performance management table 321 and the performance information of the external storage management table 322 for the pool volume group comprising the external pool volume (S2513).

The tier management program 312, for example, can find the controller performance by multiplying a value, which is obtained by dividing the number of volumes belonging to the pool volume group by the number of coupled volumes 812 of the external storage management table 322, by the value of the controller performance 712 of the external storage performance management table 321 (controller performance=external storage controller performance× (number of volumes belonging to pool volume group)/number of coupled volumes)).

The tier management program 312 stores the controller performance 1117 and the path performance 1118 of the external storage, which have been computed, in the pool volume group management table 325 (S2514). In a case where computation is not possible because a portion of the information is "Unknown", "Unknown" may be stored in either the response 1115 or the IOPS 1116 (S2514).

It can be assumed that the value, which is the smallest of the drive throughput performance 1116, the external storage controller performance 1117, and the external storage path performance 1118 in the pool volume group management table 325, will become the bottleneck. Consequently, the tier management program 312 computes the smallest value of these 1116, 1117 and 1118 (S2515). The tier management program 312 stores this smallest value in the external tier throughput 1119 of the pool volume group management table 325 (S2516).

Figure 26:
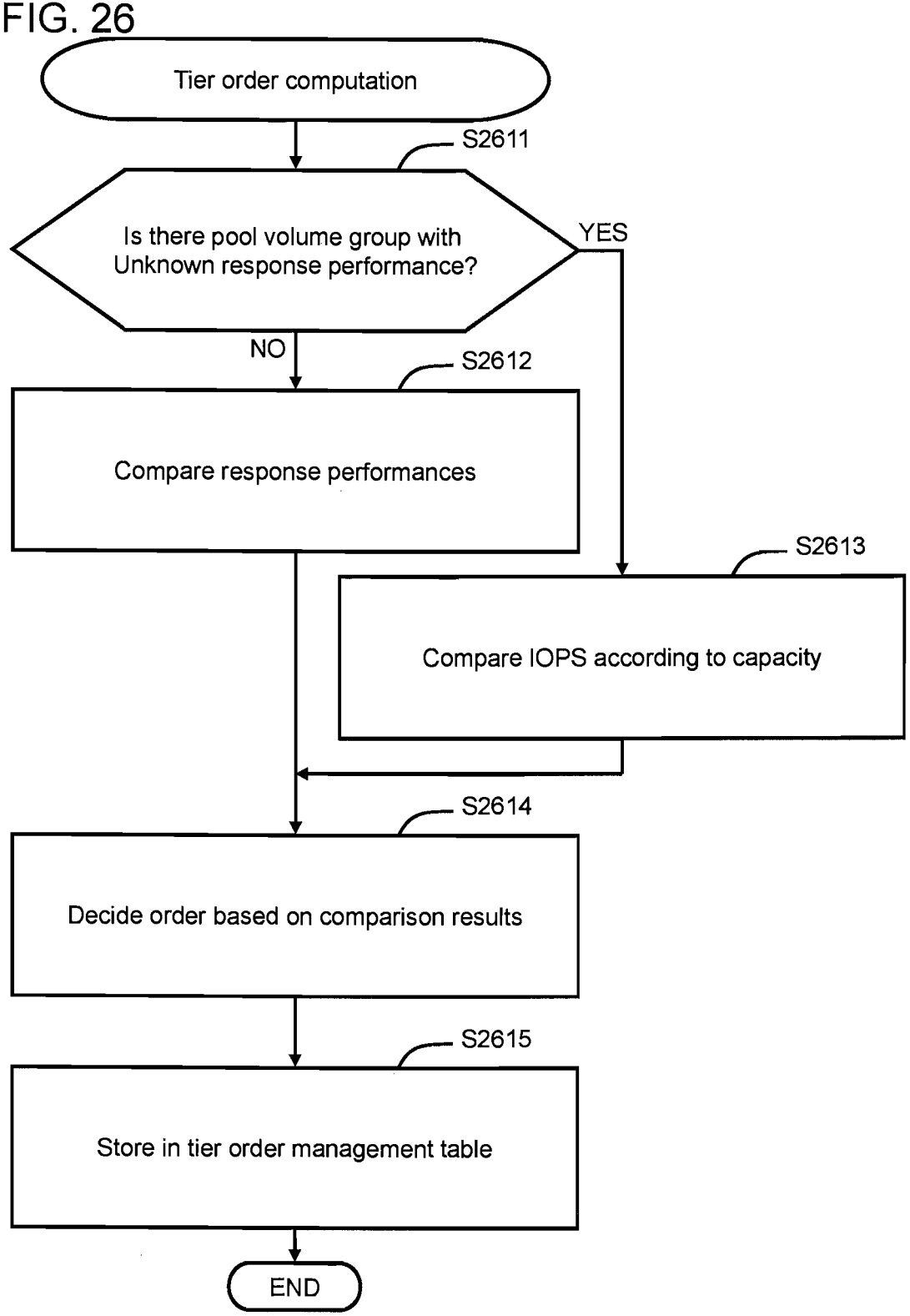
FIG. 26 is a flowchart showing a process for computing the rank order of a tier.

FIG. 26 is a flowchart showing the tier ranking computation process (S1718). The tier ranking computation program 313 determines whether there is even one pool volume group in which the value of the response 1115 of the pool volume group management table 325 is "Unknown" (S2611).

In a case where there is no pool volume group in which the response 1115 value is "Unknown" (S2611: NO), the tier ranking computation program 313 compares the response performance of the respective pool volume groups based on the value of the response 1115 (S2612).

In a case where there is a pool volume group in which the response 1115 value is "Unknown" (S2611: YES), the tier ranking computation program 313 compares the pool volume groups based on the IOPS per capacity of the tiers (S2613).

For example, the tier ranking computation program 313 divides the external tier performance 1119 of the pool volume group management table 325 by the tier storage capacity thereof, and computes the IOPS per capacity of the tier. Furthermore, in this example, a value is inputted to the external tier performance 1119 even when the response 1115 is "Unknown".

The tier ranking computation program 313 decides the rank order of the tiers based on the comparison result of either S2612 or S2613 (S2614). For example, the tier ranking computation program 313 can decide the rank order of the tier to which each pool volume group belongs by rearranging the respective pool volume groups in descending order according to performance.

The tier ranking computation program 313 records the tier rankings decided in S2614, and the performance data that constituted the determination criteria for this ranking in the tier ranking management table 326 (S2615).

Figure 27:
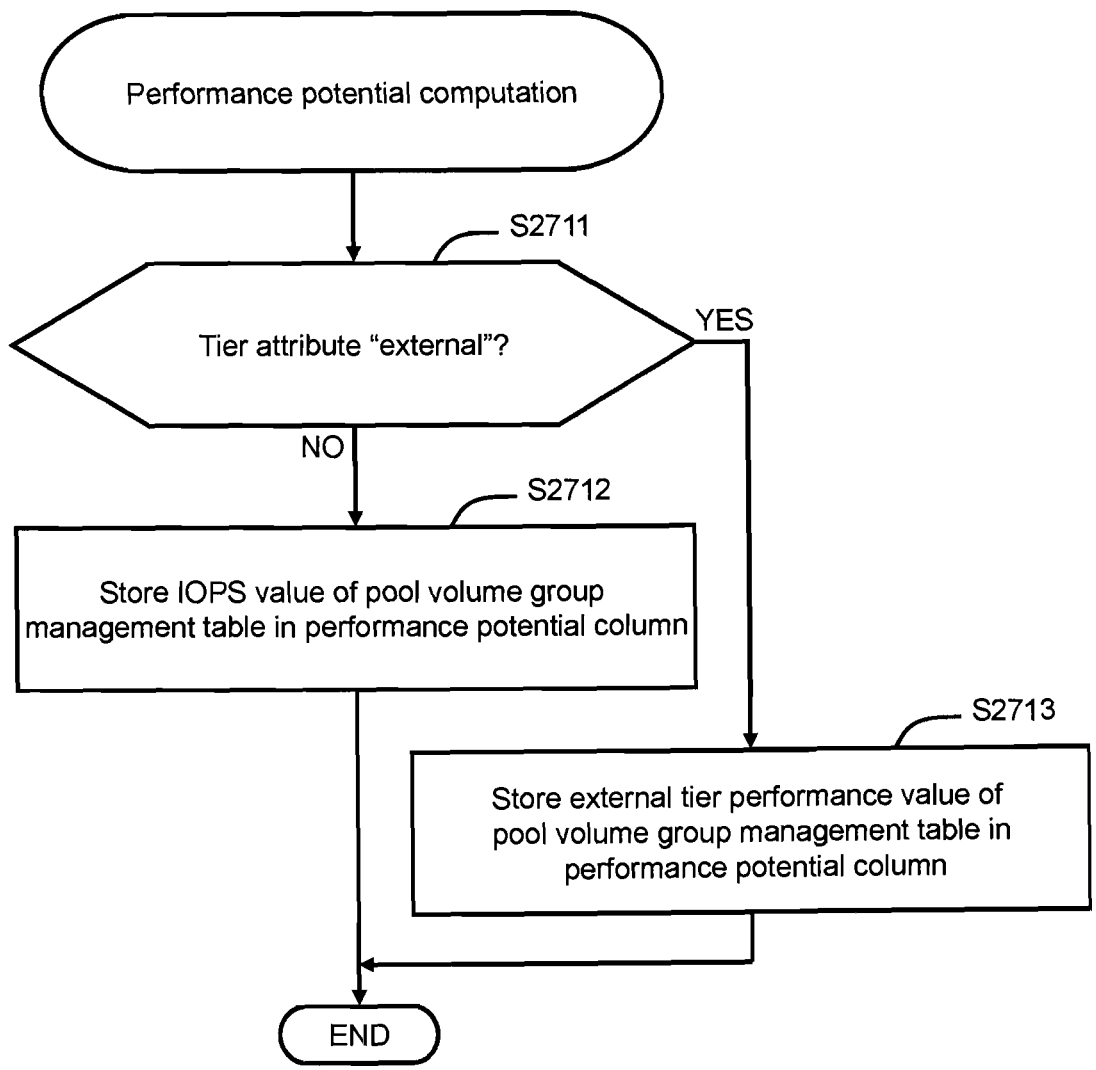
FIG. 27 is a flowchart showing a process for computing a performance potential.

FIG. 27 is a flowchart showing the process (S1719) for computing the performance potential.

The performance potential computation program 314 determines whether or not the attribute of the tier, which is the performance potential computation target, is "external volume" (S2711). In a case where the target tier attribute is not external volume (S2711: NO), the performance potential computation program 314 records the value of the IOPS 1116 of the pool volume group management table 325 in the performance potential 1314 of the performance potential management table 327 (S2712).

Alternatively, in a case where the target tier attribute is "external volume" (S2711: YES), the performance potential computation program 314 records the value of the external tier performance 1119 of the pool volume group management table 325 in the performance potential 1314 of the performance potential management table 327 (S2713).

Figure 28:
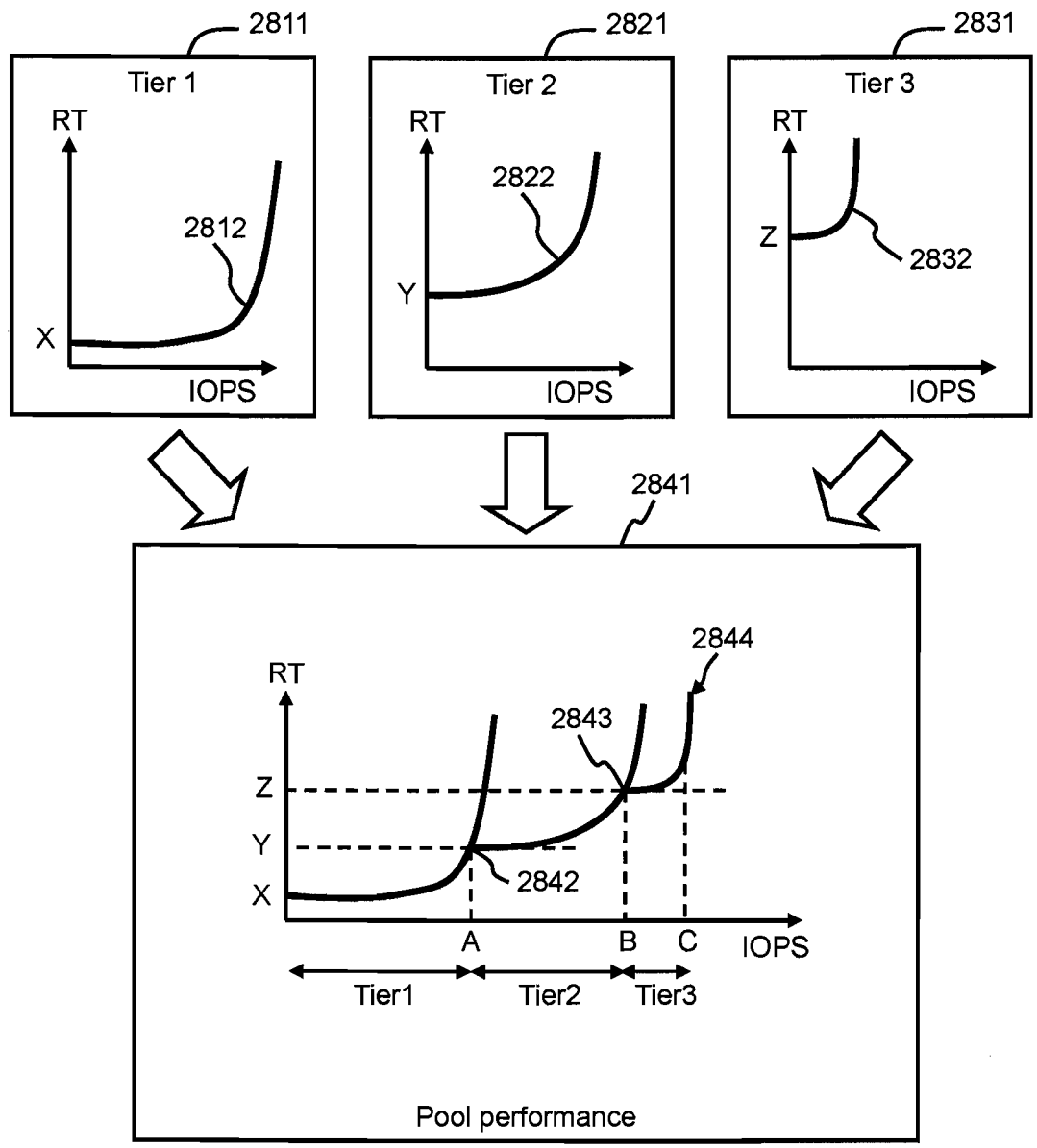
FIG. 28 shows an example of a method for finding the performance potential of each tier from a response curve.

FIG. 28 schematically shows a method for finding the performance potential of each tier based on the response curve. FIG. 28 explains the contents of the response curve analysis process (S1720) shown in FIG. 17.

Characteristic diagrams 2811, 2821, and 2831 show the response curve of each pool volume group. These characteristic diagrams graph the values shown in the pool volume response curve management table 328 by showing the response time 1413 on the vertical axis and the IOPS 1412 on the horizontal axis for each pool volume group.

Here, the value of the point where the first curve 2812 intersects with the vertical axis in characteristic diagram 2811 is given as X, the value of the point where the second curve 2822 intersects with the vertical axis in characteristic diagram 2821 is given as Y, and the value of the point where the third curve 2832 intersects with the vertical axis in characteristic diagram 2831 is given as Z. It is supposed that X≤y≤Z.

In the response curve analysis process, the performance potential computation program 314, for example, carries out the following computations.

(1) First, obtains the first point of intersection 2842 by joining the point at which the response time of the second curve 2822 is Y with the point at which the response time of the first curve 2812 is Y. Next, obtains the second point of intersection 2843 by joining the point at which the response time of the third curve 2832 is Z with the point at which the response time of the second curve 2822 is Z. Obtains the curve 2844 by connecting the first curve 2812 and the second curve 2822 at the first point of intersection 2842, and connecting the second curve 2822 and the third curve 2832 at the second point of intersection 2843.

(2) The value of the IOPS denoted by the first point of intersection 2842 is given as A, the value of the IOPS denoted by the second point of intersection 2843 is given as B, and the maximum value of the IOPS of the curve 2844 is given as C. The performance potential of tier_A denoted by the characteristic diagram 2811 is "A". The performance potential of tier B denoted by the characteristic diagram 2821 is computed as "B-A". The performance potential of tier C denoted by the characteristic diagram 2831 is computed as "C-B".

A page up to this performance level can be allocated to the respective tiers. In other words, a page allocated to a tier is controlled so that the total value of the IOPS of each page belonging to a tier does not exceed the performance potential of this tier.

Figure 29:
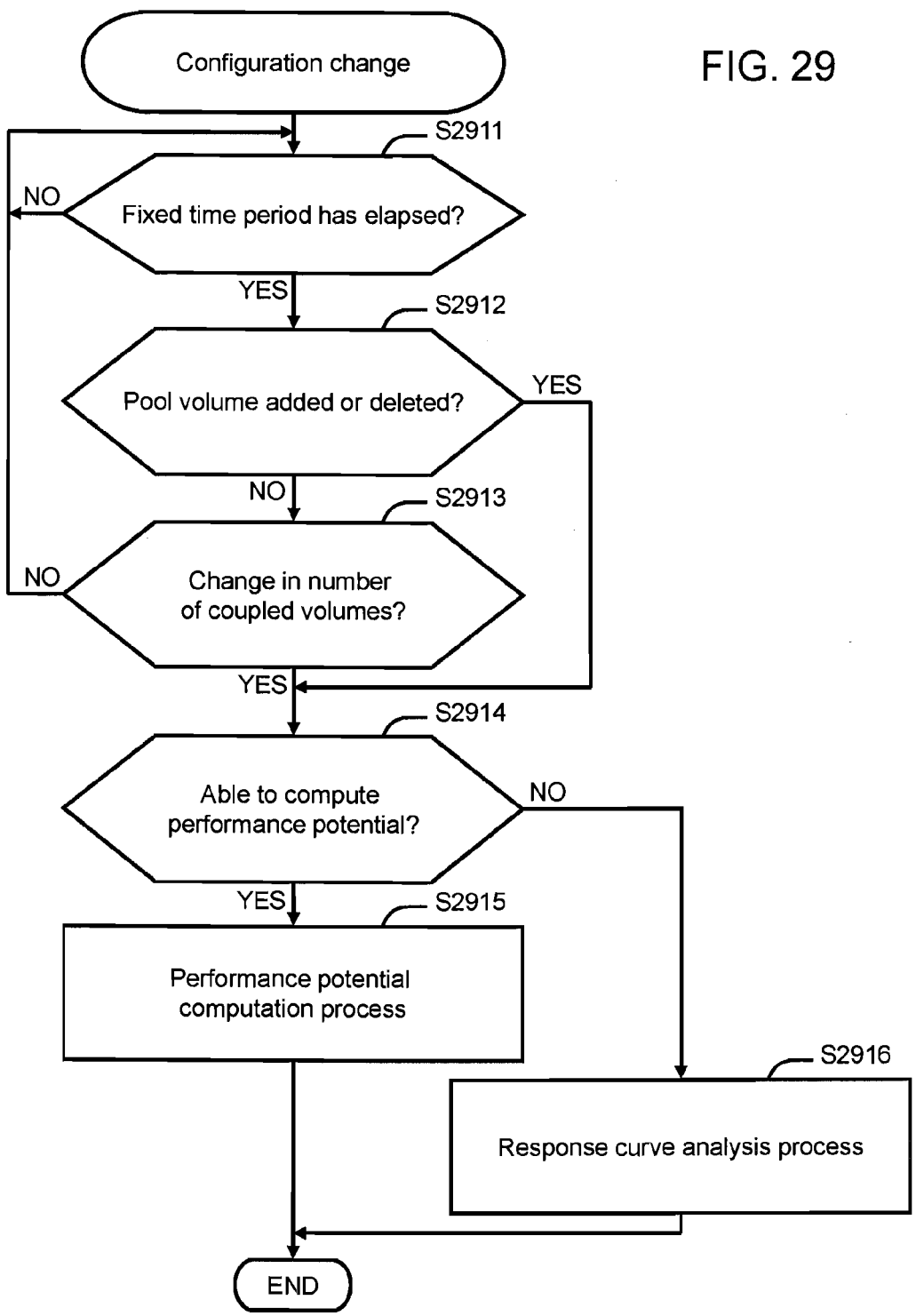
FIG. 29 is a flowchart showing processing in a case where a configuration has changed.

FIG. 29 is a flowchart showing a configuration change process. The tier configuration change program 315, after the processing shown in FIG. 17 has been executed, monitors whether a prescribed trigger has arrived, and when the prescribed trigger has arrived, recomputes the performance potential of each tier.

Examples of the prescribed trigger can be given as a case in which a fixed time period has elapsed (S2911), a case in which a pool volume has either been added or removed (S2912), and a case in which the number of volumes being provided from the external storage apparatus 102 to the first storage apparatus 101 has changed (S2913).

The tier configuration change program 315 monitors whether a specified fixed time period has elapsed (S2911), and in a case where the fixed time period has elapsed (S2911: YES), checks whether the addition or the removal of a pool volume has occurred for each pool (S2912).

In a case where neither the addition nor the removal of a pool volume has occurred (S2912: NO), the tier configuration change program 315 checks whether or not the number of coupled volumes of the external storage has changed (S2913). In a case where the number of volumes coupled to the first storage apparatus from the external storage has not changed (S2913: NO), the tier configuration change program 315 monitors the timer value once again (S2911).

Alternatively, in a case where a pool volume has either been added or removed (S2912: YES) and a case where the number of coupled volumes has changed (S2913: YES), the tier configuration change program 315 moves to the process for recomputing the performance potential.

The processing of S2914, S2915, and S2916 is the same as the contents explained in S1718-2, S1719, and S1720 of FIG. 17, and as such explanations will be omitted. In this example, when the pool configuration changes, the external storage information acquisition program 311 recomputes the performance potential.

Furthermore, an example of recomputing the performance potential when a configuration change has occurred was shown, but the present invention is not limited to this, and the configuration may be such that the performance potential is recomputed and revised on a regular basis. Or, the configuration may be such that the performance potential is recomputed in accordance with either an instruction from the management computer 104, or an instruction from the administrator.

Figure 30:
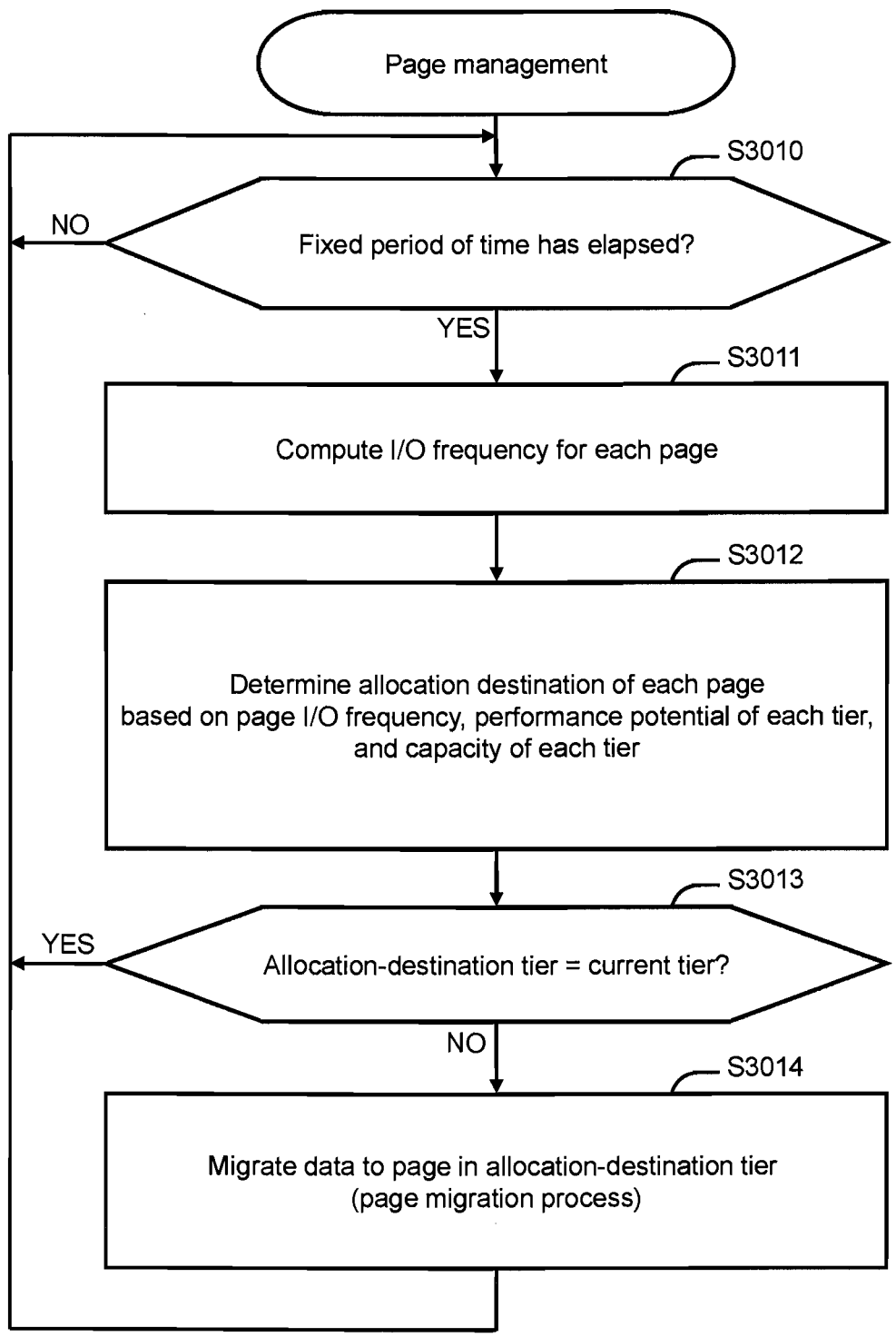
FIG. 30 is a flowchart showing a process for managing a page.

FIG. 30 is a flowchart showing a page management process. The page reallocation program 316 monitors whether a specified fixed time period has elapsed after the processing shown in FIG. 17 has been executed (S3010). Furthermore, the fixed time period here differs from the fixed time period described using FIG. 29. In a case where the specified fixed time period has elapsed (S3010: YES), the page reallocation program 316 measures the I/O frequency for each page (S3011).

The page reallocation program 316 determines the allocation-destination tier to which this page should be allocated based on the I/O frequency of the migration-target page and the capacity (performance potential) of each tier (S3012). The page reallocation program 316 determines whether the allocation-destination tier and the current tier are the same (S3013).

In a case where the allocation-destination tier and the current tier do not match (S3013: NO), the page reallocation program 316 migrates the data of the migration-target page to the allocation-destination tier (S3014), and thereafter, monitors the timer once again (S3010).

In a case where the allocation-destination tier and the current tier match (S3013: YES), the page reallocation program 316 returns to S3010 without carrying out the page migration.

As the result of either a pool configuration change or a fluctuation in network load, the tier ranking and the performance potential are recomputed and a page that should belong in a high-performance tier is likely to be allocated to a low-performance tier. However, in this example, each page can be reallocated to the tier to which it intrinsically belongs by executing the page management process shown in FIG. 30.

Figure 31:
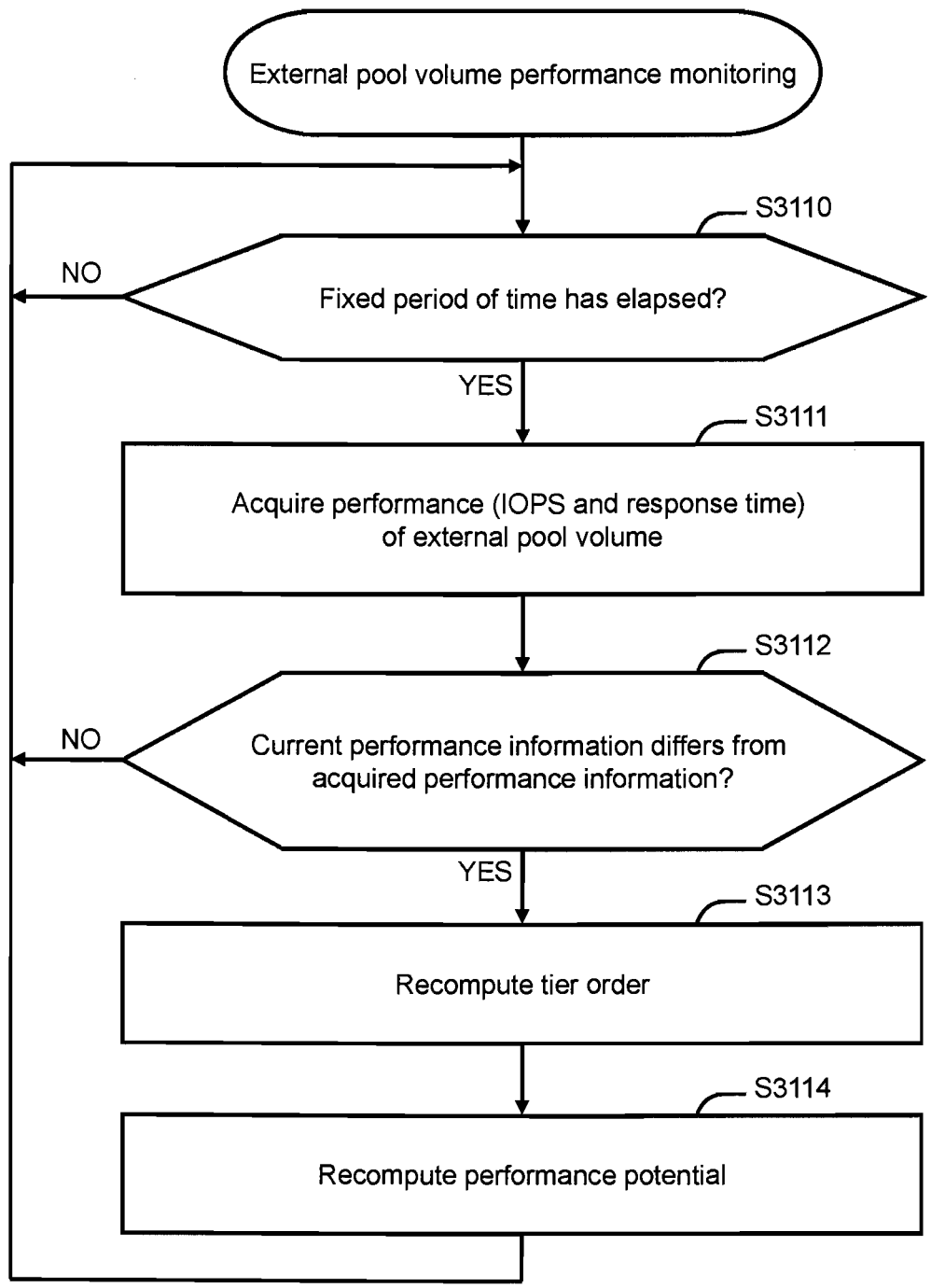
FIG. 31 is a flowchart showing a process for monitoring the performance of an externally coupled volume (external volume).

FIG. 31 is a flowchart showing a process for monitoring the performance of the external pool volume. This process, for example, is executed for monitoring whether or not the external volume performance computation result implemented in FIG. 17 is correct.

This process is executing by the external storage performance monitoring program 317 of the first storage apparatus 101. The present invention is not limited to this, and the configuration may be such that either the management computer 104 acquires the external volume performance, or either all or a portion of the information related to the external volume performance is acquired from the administrator. Furthermore, FIG. 31 shows an example in which the external volume performance is acquired regularly, but the present invention is not limited to this, and the external volume performance may be monitored at a time that has been specified by either the management computer 104 or the administrator.

The external storage performance monitoring program 317 monitors whether a specified fixed time period has elapsed following the execution of the flow of processing shown in FIG. 17 (S3110). In a case where the fixed time period has not elapsed (S3110: NO), the program 317 waits.

In a case where the specified fixed time period has elapsed (S3110: YES), the external storage performance monitoring program 317 acquires the performance information of an arbitrary external pool volume (S3111). The performance information, for example, is the throughput and/or the response performance. An I/O, which is used to target the information to be acquired, for example, is an ordinary I/O from the host computer 103. That is, the performance information can be obtained by storing the time required to process a command from the host computer 103 as a history. The present invention is not limited to this, and the configuration may be such that a random I/O for measuring performance is issued, and the performance information is obtained from the result of the response thereto.

The external storage performance monitoring program 317 determines whether the performance information acquired with respect to the pool volume differs from performance information acquired in the past (S3112). In a case where the current performance information and the past performance information are a match (S3112: NO), there is no need to recompute the tier ranking and performance potential. Consequently, the program 317 returns to S3110.

The match between the current performance information and the past performance information is not limited to a case in which the two sets of information match completely, and a case in which the difference with the past performance information is equal to or less than a prescribed threshold may be determined to be a match. In addition, even in a case where a difference that exceeds this threshold was detected, the current performance information and the past performance information may be determined to be a match until this threshold-exceeding difference has been detected a prescribed number of times or more.

In a case where the current performance information and the past performance information differ (S3112: YES), the external storage performance monitoring program 317 recomputes the tier ranking (S3113). The contents of the processing of S3113 are the same as the contents described in S1715 through S1718 of FIG. 17, and as such, an explanation thereof will be omitted. However, not all of the contents of the S1715 through S1718 need to be executed all the time. A portion of the processing may be arbitrarily omitted as needed.

The external storage performance monitoring program 317 recomputes the performance potential (S3114). The processing contents of S3114 are the same as those of S1718-2, S1719, and S1720 of FIG. 17, and as such, an explanation thereof will be omitted. However, not all of these steps are necessarily executed.

In accordance with configuring this example like this, based on the performance information of the multiple pool volumes in the system, it is possible to group the respective pool volumes into multiple pool volume groups and to create tiers from these pool volume groups. Since the multiple pool volumes that exist in the system are sorted to form multiple tiers, it is possible to create a pool comprising a tier configuration that is suited to the current situation.

When disposing multiple tiers inside a pool, the performance condition of each tier is normally configured. For example, a first tier will require performance of equal to or higher than 10000 IOPS, and a second tier will require performance of between 3000 and 9999 IOPS. In a case where the creation condition (performance condition) of a tier is stipulated beforehand like this, predicting the ultimate performance of the pool is simple. However, by contrast, in a case where a pool volume matching the performance condition of a certain tier cannot be found, this tier cannot be created. Furthermore, since a pool is partitioned in accordance with the performance conditions, there is the likelihood that a large number of pool volumes in the system will be allocated to specific tiers, making it impossible to realize the functionality of a hierarchical pool.

Alternatively, in this example, a tier (a pool volume group) is created based on the performance of each pool volume in the system without deciding the tier performance condition. Therefore, it is possible to create a pool comprising a tier configuration that conforms to the current type and number of pool volumes, thereby enhancing usability.

An example of the present invention has been explained hereinabove, but needless to say the present invention is not limited to this example, and various changes can be made without departing from the gist thereof.

For example, when mounting volumes from the external storage, the first storage apparatus 101 may collectively mount the volumes into a single volume in units of drive type. This makes it possible to reduce the external volume management information held by the first storage apparatus 101, and, in addition, makes it possible to reduce the number of volumes to be measured.

Specifically, for example, in a case where five SSD volumes, each comprising a size of 100 MB, are included inside a certain external storage, the first storage apparatus 101, instead of managing the five SSD volumes individually, can consolidate the five SSD volumes into a single volume and manage these five SSD volumes as a single SSD volume comprising a size of 500 MB. Collectively managing external pool volumes of the same type as a single volume makes it possible to group the pool volumes together more rapidly.

This example comprises the characteristic feature by which a tier, which is suitable to the current situation, can be constructed based on the performance information of multiple pool volumes included in the current storage system. For this reason, in this example, the performance information of a large number of external pool volumes must be acquired and managed. However, when an external pool volume is managed in accordance with an actual drive, the size of the management table is enormous, and, in addition, grouping the pool volumes together also takes time.

Consequently, in a case where the first storage apparatus 101 mounts an external pool volume from the external storage apparatus 102, external pool volumes configured from the same type drive are collectively mounted as a single external pool volume. A configuration in which the same type external pool volumes are collectively mounted as a single volume, for example, can be realized in a case where the pool volume performance management table 324 shown in FIG. 10 is created. A configuration like this can be readily understood by a person having ordinary skill in the art.

Also, for example, in a case where a measurement-target external volume is configured to write-disabled, the first storage apparatus 101 may issue a read request instead of a write request and infer the performance from the result of this measurement.

In addition, this example can also be realized as either a computer program or a computer system as described below.

Description 1. A computer program for operating a computer as a first storage control apparatus, which is communicatably coupled to at least one second storage control apparatus via a communication path, wherein the above-mentioned computer:
acquires volume performance information denoting the performance of multiple logical volumes;
creates multiple volume groups by grouping the above-mentioned logical volumes based on the above-mentioned acquired volume performance information;
computes volume group performance information denoting the performance of each of the above-mentioned volume groups;
decides the rank order of the above-mentioned volume groups in accordance with the above-mentioned computed volume group performance information; and
disposes tiers of the above-mentioned volume groups in a pool based on the above-mentioned decided rank order.

Description 2. A computer system, which comprises a first storage control apparatus coupled to a host computer, a second storage control apparatus coupled to the above-mentioned first storage control apparatus, and a management computer coupled to at least the above-mentioned first storage control apparatus and the above-mentioned second storage control apparatus, wherein the first storage control apparatus comprises a pool and a controller for controlling the above-mentioned pool,
wherein the controller:
acquires volume performance information denoting the performance of multiple logical volumes;
creates multiple volume groups by grouping the above-mentioned logical volumes based on the above-mentioned acquired volume performance information;
computes volume group performance information denoting the performance of each of the above-mentioned volume groups;
decides the rank order of the above-mentioned volume groups in accordance with the above-mentioned computed volume group performance information; and
disposes tiers of the above-mentioned volume groups in the above-mentioned pool based on the above-mentioned decided rank order.

REFERENCE SIGNS LIST

101 First storage apparatus
102 Second storage apparatus
103 Host computer
104 Management computer

The invention claimed is:

1. A first storage control apparatus, which is communicatably coupled to at least one second storage control apparatus via a communication path, comprising:
a pool; and
a controller for controlling the pool,
wherein the controller:
acquires volume performance information denoting the performance of multiple logical volumes;
creates multiple volume groups by grouping the logical volumes based on the acquired volume performance information;
computes volume group performance information denoting the performance of each of the volume groups;
decides a rank order of the volume groups in accordance with the computed volume group performance information; and
disposes tiers of the volume groups in the pool based on the decided rank order.

2. The first storage control apparatus according to claim 1, wherein the multiple logical volumes comprise first logical volumes of the first storage control apparatus, and second logical volumes of the second storage control apparatus, and the second logical volume is associated with a prescribed first logical volume of the first logical volumes via the communication path.

3. The first storage control apparatus according to claim 2, wherein the controller acquires the volume performance information by treating, from among the second logical volumes, second logical volumes which belong to the same second storage control apparatus and which are created based on the same type of storage devices, as a single second logical volume.

4. The first storage control apparatus according to claim 3, wherein the controller acquires the volume performance information related to the second logical volume from a management computer which is communicatably coupled to the first storage control apparatus and the second storage control apparatus.

5. The first storage control apparatus according to claim 4, wherein the controller uses, as the volume performance information of the second logical volume, a performance with the smallest value from among a throughput performance of the second logical volume, a controller performance of the second storage control apparatus for controlling the second logical volume, and a communication port performance of the second storage control apparatus for controlling the second logical volume.

6. The first storage control apparatus according to claim 5, wherein the controller groups the second logical volumes based on the volume performance information of the first logical volume.

7. The first storage control apparatus according to claim 6, wherein the controller, in accordance with a preconfigured prescribed trigger, recomputes the performance information of the volume groups, decides the rank order of the volume groups based on the recomputed performance information of the volume groups, and disposes tiers of the volume groups in the pool.

8. The first storage control apparatus according to claim 7, wherein the prescribed trigger comprises at least one of either a case in which a configuration of the pool has changed, or a case in which the number of the second logical volumes coupled to the prescribed first logical volume has changed.

9. The first storage control apparatus according to claim 3, wherein the controller issues, to the second logical volume, a test command that is prepared beforehand, and acquires the volume performance information related to the second logical volume based on a response from the second logical volume.

10. The first storage control apparatus according to claim 9, wherein the controller, based on a response time of the second logical volume with respect to the test command, acquires a response curve denoting a relationship between a processing request load and a response time, and acquires the volume performance information related to the second logical volume based on the response curve.

11. The first storage control apparatus according to claim 10, wherein the controller determines whether or not a response result related to another second logical volume of the same configuration as the second logical volume which is an issuing target of the test command, has been already stored, and in a case where the response result has been already stored, uses the already-stored response result with respect to the second logical volume which is the issuing target of the test command, and does not issue the test command.

12. The first storage control apparatus according to claim 11, wherein the controller, in accordance with a preconfigured prescribed trigger, recomputes the performance information of the volume groups, decides the rank order of the volume groups based on the recomputed performance information of the volume groups, and disposes tiers of the volume groups in the pool.

13. The first storage control apparatus according to claim 12, wherein the prescribed trigger comprises at least one of either a case in which a configuration of the pool has changed, or a case in which the number of the second logical volumes coupled to the prescribed first logical volume has changed.

14. A method for controlling a first storage control apparatus, which is communicatably coupled to at least one second storage control apparatus via a communication path, wherein the first storage control apparatus comprises a pool, and a controller for controlling the pool, and wherein the controller:

acquires volume performance information denoting the performance of multiple logical volumes;

creates multiple volume groups by grouping the logical volumes based on the acquired volume performance information;

computes volume group performance information denoting the performance of each of the volume groups;

decides a rank order of the volume groups in accordance with the computed volume group performance information; and disposes tiers of the volume groups in the pool based on the decided rank order.

* * * * *